US012756979B2

(12) United States Patent
Imahama

(10) Patent No.: US 12,756,979 B2
(45) Date of Patent: Oct. 6, 2026

(54) SOUND BAR SYSTEM, SOUND BAR, CONTROLLER, PROGRAM, AND METHOD FOR SETTING SOUND BAR

(71) Applicant: D&M Holdings Inc., Kanagawa (JP)

(72) Inventor: Yoshiharu Imahama, Fukushima (JP)

(73) Assignee: D&M Holdings Inc., Kanagawa (JP)

( * ) Notice: Subject to any disclaimer, the term of this patent is extended or adjusted under 35 U.S.C. 154(b) by 210 days.

(21) Appl. No.: 18/552,047

(22) PCT Filed: Sep. 28, 2021

(86) PCT No.: PCT/JP2021/035552
§ 371 (c)(1),
(2) Date: Sep. 22, 2023

(87) PCT Pub. No.: WO2022/201598
PCT Pub. Date: Sep. 29, 2022

(65) Prior Publication Data

US 2024/0179467 A1 May 30, 2024

(30) Foreign Application Priority Data

Mar. 22, 2021 (JP) ................................. 2021-047983

(51) Int. Cl.
*H04R 5/04* (2006.01)
*H04R 1/40* (2006.01)
*H04R 3/12* (2006.01)

(52) U.S. Cl.
CPC ............... *H04R 5/04* (2013.01); *H04R 1/403* (2013.01); *H04R 3/12* (2013.01); *H04R 2205/024* (2013.01); *H04R 2430/01* (2013.01)

(58) Field of Classification Search
CPC . H04R 5/04; H04R 1/403; H04R 3/12; H04R 2205/024; H04R 2430/01
See application file for complete search history.

(56) References Cited

U.S. PATENT DOCUMENTS

2015/0016642 A1* 1/2015 Walsh ..................... H04S 7/301 381/307
2017/0053641 A1 2/2017 Kamdar et al.
(Continued)

FOREIGN PATENT DOCUMENTS

JP 2007142856 A 6/2007
JP 2009055450 A 3/2009
JP 2009118120 A 5/2009

*Primary Examiner* — Paul W Huber

(74) *Attorney, Agent, or Firm* — Nieves IP Law Group, LLC; Peter A. Nieves

(57) ABSTRACT

[Problem] To achieve natural surround audio at a given viewing/listening position even when a sound bar cannot be placed under the center of a display device. [Solution] When a sound bar 1 is placed under the left side of a television receiver 3: the output timing of an Rch speaker 10-3 is delayed by T relative to that of a Cch speaker 10-1; the output timing of the speaker 10-1 is delayed by T relative to that of an Lch speaker 10-2: the output sound volume of the speaker 10-3 is made smaller by V than that of the speaker 10-1; and the output sound volume of the speaker 10-1 is made smaller by V than that of the speaker 10-2. When the sound bar 1 is placed under the right side of the television receiver 3: the output timing of the speaker 10-2 is delayed by T relative to that of the speaker 10-1: the output timing of the speaker 10-1 is delayed by T relative to that of the speaker 10-3: the output sound volume of the speaker 10-2 is made smaller by V than that of the speaker 10-1; and the output sound volume of the speaker 10-1 is made smaller by V than that of the speaker 10-3.

18 Claims, 14 Drawing Sheets

(56) References Cited

U.S. PATENT DOCUMENTS

| | | | | |
|---|---|---|---|---|
| 2018/0176688 | A1* | 6/2018 | Baek | H04R 5/04 |
| 2019/0215634 | A1 | 7/2019 | Doolittle et al. | |
| 2019/0394599 | A1* | 12/2019 | Shi | G06F 3/165 |
| 2020/0267473 | A1 | 8/2020 | Matsukawa et al. | |

* cited by examiner

CONTROLLER 2

ARRANGEMENT INFORMATION INPUT SCREEN

ARRANGEMENT INFORMATION INPUT SCREEN

SOUND BAR 1a

SOUND BAR 1a
(ASSIGNED CHANNEL RESETTING PROCESSING)

SOUND BAR SYSTEM, SOUND BAR, CONTROLLER, PROGRAM, AND METHOD FOR SETTING SOUND BAR

CROSS-REFERENCE TO RELATED APPLICATIONS

This application is a U.S. National Stage of International Application No. PCT/JP2021/035552, filed Sep. 28, 2021, entitled SOUND BAR SYSTEM, SOUND BAR, CONTROLLER, PROGRAM, AND METHOD FOR SETTING SOUND BAR, which claims the benefit of Japanese Patent Application serial number 2021-047983, filed Mar. 22, 2021, both of which are incorporated by reference herein in their entirety.

TECHNICAL FIELD

The present invention relates to a technology of setting a sound bar.

BACKGROUND ART

In recent years, home theater systems using a display device such as a liquid crystal display (LCD) or an organic electro luminescence (EL) display and a sound bar have become widespread. A sound bar is a speaker system configured to accommodate speakers of a plurality of channels in the same housing. Compared to installing a speaker for each channel individually, installation space efficiency is better and the installation work is easier. Therefore, through use of a sound bar, a surround sound audio reproduction environment can be easily achieved even in an ordinary home with limited space (for example, Patent Literature 1).

CITATION LIST

Patent Literature

[PTL 1] JP 2009-55450 A

SUMMARY OF INVENTION

Technical Problem

Typically, in a sound bar, an output volume and an output timing of the speaker of each channel forming the sound bar are adjusted so that the optimum surround sound effect is obtained at a predetermined viewing position (specifically, a position in front of the display device by a predetermined distance from the display device) when the sound bar is installed in a below-and-center position of the display device.

However, due to structural limitations in the display device, the sound bar may not be installed at a recommended position (for example, the below-and-center position) with respect to the display device. For example, in a case in which a remote control sensor is arranged at a lower right side of the display device and the remote control sensor is hidden by the sound bar when the sound bar is installed at the below-and-center position of the display device, the sound bar is required to be moved to the left of the below-and-center position of the display device so that the remote control sensor is not hidden. Further, in a case in which the remote control sensor is arranged at a lower left side of the display device and the remote control sensor is hidden by the sound bar when the sound bar is installed at the below-and-center position of the display device, the sound bar is required to be moved to the right of the below-and-center position of the display device so that the remote control sensor is not hidden. Further, depending on the installation space, it may not be possible to install the sound bar at the below-and-center position of the display device. Thus, when it is not possible to install the sound bar at the below-and-center position of the display device, it may not be possible to achieve the optimum surround sound audio at a predetermined viewing position.

Moreover, even when the user replaces the display device, the user may want to continue using the sound bar. For example, when the display device to be combined with the sound bar that the user currently has includes a larger screen than that of the previous display device, the width of the sound bar decreases relative to the screen width of the display device, and as a result, the user may not be able to listen to surround sound audio having an expansive sound that matches the screen size of the display device. In order to listen to surround sound audio having an expansive sound that matches the screen size of the display device, it is required to purchase an expensive sound bar having a width that matches the screen size of the display device, which increases costs, and further, the sound bar used up to then goes to waste.

The present invention has been made in consideration of the above-mentioned circumstances, and a first object thereof is to achieve more appropriate surround sound audio at a predetermined viewing position even when a sound bar is not able to be installed at a recommended position with respect to a display device. A second object of the present invention is to achieve, even when a width of the sound bar that a user currently has is small relative to a screen width of the display device, surround sound audio having an expansive sound that matches a screen size of the display device, without wasting the sound bar used up to then.

Solution to Problem

In order to solve the above-mentioned problems, in a first aspect of the present invention, an output volume and an output timing of a speaker of each channel forming a sound bar are adjusted in accordance with an installation position of the sound bar with respect to a display device so that the optimum surround sound effect can be obtained at a predetermined viewing position. For example, when the sound bar is installed to the left of a below-and-center position or an above-and-center position of the display device, the output timing of the speaker of a right channel is delayed from the output timing of the speaker of a center channel by a predetermined delay time T and the output timing of the speaker of the center channel is delayed from the output timing of the speaker of a left channel by the above-mentioned delay time T, and the output volume of the speaker of the right channel is reduced from the output volume of the speaker of the center channel by a predetermined attenuation volume V and the output volume of the speaker of the center channel is reduced from the output volume of the speaker of the left channel by the above-mentioned attenuation volume V. Further, when the sound bar is installed to the right of the below-and-center position or the above-and-center position of the display device, the output timing of the speaker of the left channel is delayed from the output timing of the speaker of the center channel by the above-mentioned delay time T and the output timing of the speaker of the center channel is delayed from the output timing of the speaker of the right channel by the above-mentioned delay time T, and the output volume of the speaker of the left channel is reduced from the output volume of the speaker of the center channel by the above-mentioned attenuation volume V and the output volume of the speaker of the center channel is reduced from the output volume of the speaker of the right channel by the above-mentioned attenuation volume V. Here, the delay time T and the attenuation volume V can be freely set by a user. Further, the delay time T and the attenuation volume V may be automatically calculated in accordance with a deviation amount of the sound bar from the below-and-center position or the above-and-center position of the display device.

For example, according to the first aspect of the present invention, there is provided a sound bar system including: a sound bar configured to accommodate speakers of a plurality of channels including at least a center channel, a left channel, and a right channel in the same housing; and a controller configured to set an output volume and an output timing of the speaker of each of the plurality of channels, wherein the controller includes: receiving means for receiving an installation position of the sound bar with respect to a display device forming a home theater system together with the sound bar; speaker properties determination means for determining the output volume and the output timing of the speaker of each of the center channel, the left channel, and the right channel in accordance with the installation position of the sound bar received by the receiving means; and speaker properties setting means for setting the output volume and the output timing of the speaker of each of the center channel, the left channel, and the right channel determined by the speaker properties determination means in the sound bar, wherein the sound bar includes output properties adjustment means for adjusting the output volume and the output timing of the speaker of each of the center channel, the left channel, and the right channel in accordance with the setting by the controller, and wherein the speaker properties determination means is configured to: when the installation position of the sound bar received by the receiving means is to a left of a below-and-center position or an above-and-center position of the display device, delay the output timing of the speaker of the right channel from the output timing of the speaker of the center channel by a predetermined delay time T and delay the output timing of the speaker of the center channel from the output timing of the speaker of the left channel by the delay time T, and reduce the output volume of the speaker of the right channel from the output volume of the speaker of the center channel by a predetermined attenuation volume V and reduce the output volume of the speaker of the center channel from the output volume of the speaker of the left channel by the attenuation volume V; and when the installation position of the sound bar received by the receiving means is to a right of the below-and-center position or the above-and-center position of the display device, delay the output timing of the speaker of the left channel from the output timing of the speaker of the center channel by the delay time T and delay the output timing of the speaker of the center channel from the output timing of the speaker of the right channel by the delay time T, and reduce the output volume of the speaker of the left channel from the output volume of the speaker of the center channel by the attenuation volume V and reduce the output volume of the speaker of the center channel from the output volume of the speaker of the right channel by the attenuation volume V.

Further, in a second aspect of the present invention, when a home theater system is built by combining a plurality of sound bars with a display device, channels of speakers accommodated in each sound bar are set in accordance with installation positions of those sound bars with respect to the display device. For example, when the plurality of sound bars are aligned in a screen width direction of the display device below the display device, the speakers accommodated in the plurality of sound bars are divided into a first group positioned at the below-and-center position of the display device, a second group positioned to the left of the below-and-center position of the display device, and a third group positioned to the right of the below-and-center position of the display device, and the channel of the speakers belonging to the first group, the channel of the speakers belonging to the second group, and the channel of the speakers belonging to the third group are set to be the center channel, the left channel, and the right channel, respectively.

For example, according to the second aspect of the present invention, there is provided a sound bar system including: a plurality of sound bars each configured to accommodate a plurality of speakers in the same housing; and a controller configured to set a channel of each of the plurality of speakers accommodated in each of the plurality of sound bars, wherein the controller includes: receiving means for receiving an installation position of each of the plurality of sound bars with respect to a display device forming a home theater system together with the plurality of sound bars; assigned channel determination means for determining the channel to be assigned to each of the plurality of speakers accommodated in each of the plurality of sound bars in accordance with the installation position of each of the plurality of sound bars received by the receiving means; and channel setting means for setting, in each of the plurality of sound bars, the assigned channel determined by the assigned channel determination means for each of the plurality of speakers accommodated in the each of the plurality of sound bars, wherein each of the plurality of sound bars includes audio control means for distributing, to each of the plurality of speakers accommodated in the each of the plurality of sound bars, an audio signal of the channel set for the each of the plurality of speakers by the controller, and the assigned channel determination means is configured to classify, when the installation positions of the plurality of sound bars received by the receiving means are aligned in a screen width direction of the display device below the display device, the speakers accommodated in the plurality of sound bars into a first group positioned at a below-and-center position of the display device, a second group positioned to a left of the below-and-center position of the display device, and a third group positioned to a right of the below-and-center position of the display device, and determine the channel to be assigned to the speakers belonging to the first group, the channel to be assigned to the speakers belonging to the second group, and the channel to be assigned to the speakers belonging to the third group to be a center channel, a left channel, and a right channel, respectively.

Advantageous Effects of Invention

According to the first aspect of the present invention, the output volume and the output timing of the speaker of each channel forming the sound bar are adjusted in accordance with the installation position of the sound bar with respect to the display device, and thus it is possible to achieve more appropriate surround sound audio at a predetermined viewing position even when the sound bar is not able to be installed at the below-and-center position of the display device.

Further, according to the second aspect of the present invention, when the home theater system is built by combining the plurality of sound bars with the display device, the channels of the speakers accommodated in each sound bar are set in accordance with the installation positions of those sound bars with respect to the display device, and thus even when the width of the sound bar that the user currently has is small relative to the screen width of the display device, by adding the sound bar, it is possible to achieve surround sound audio having an expansive sound that matches the screen size of the display device, without wasting the current sound bar used up to then.

DESCRIPTION OF EMBODIMENTS

Embodiments of the present invention are described below with reference to the drawings.

First Embodiment

First, a first embodiment of the present invention is described.

Figure 1:
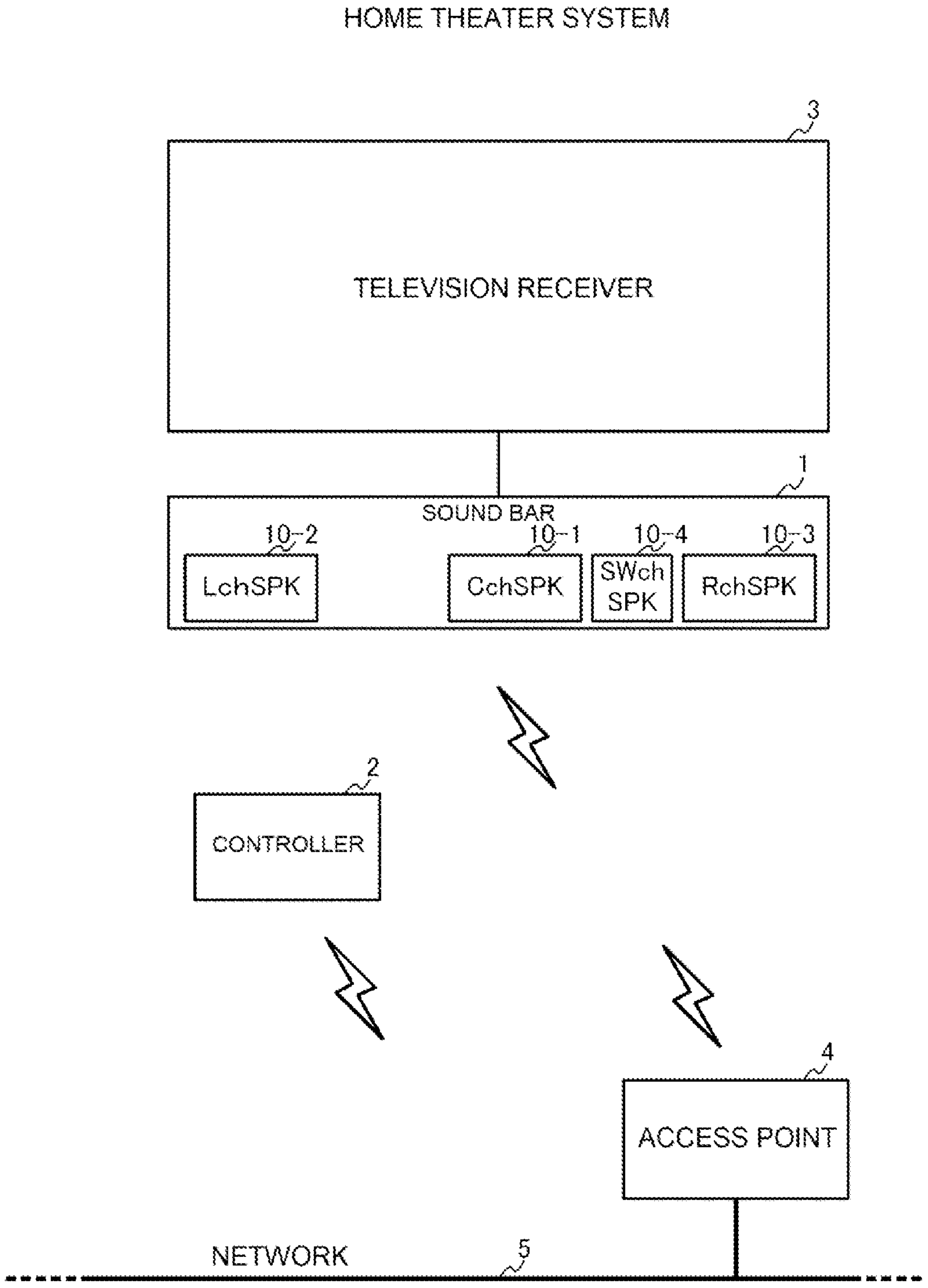
FIG. 1 is a schematic configuration diagram of a home theater system in a first embodiment of the present invention.

FIG. 1 is a schematic configuration diagram of a home theater system in this embodiment.

As illustrated in the figure, the home theater system in this embodiment includes a television receiver 3, a sound bar 1 connected to the television receiver 3 by a communication interface such as high-definition multimedia interface (HDMI (trademark)) or universal serial bus (USB), and a controller 2 for setting output properties of the sound bar 1. The sound bar 1 and the controller 2 are connected to each other via an access point 4 connected to a network 5 such as a wide area network (WAN) or a local area network (LAN).

The sound bar 1 is a so-called one-body type sound bar that includes, in addition to a center channel speaker (CchSPK) 10-1, a left channel speaker (LchSPK) 10-2, and a right channel speaker (RchSPK) 10-3, a subwoofer channel speaker (SWchSPK) 10-4, and a surround audio reproduction environment can be achieved by a single sound bar 1. However, the sound bar 1 may be a so-called two-unit type sound bar in which the subwoofer channel speaker 10-4 is omitted. In this case as well, a surround sound audio reproduction environment can be achieved by externally connecting the subwoofer channel speaker 10-4 to the sound bar 1.

The controller 2 adjusts an output volume and output timing of the center channel speaker 10-1, the left channel speaker 10-2, and the right channel speaker 10-3 of the sound bar 1 in accordance with an installation position of the sound bar 1 with respect to the television receiver 3 so that an optimum surround sound effect can be obtained at a predetermined viewing position (for example, a position in front of the television receiver 3 by a predetermined distance from the television receiver 3).

Figure 2:
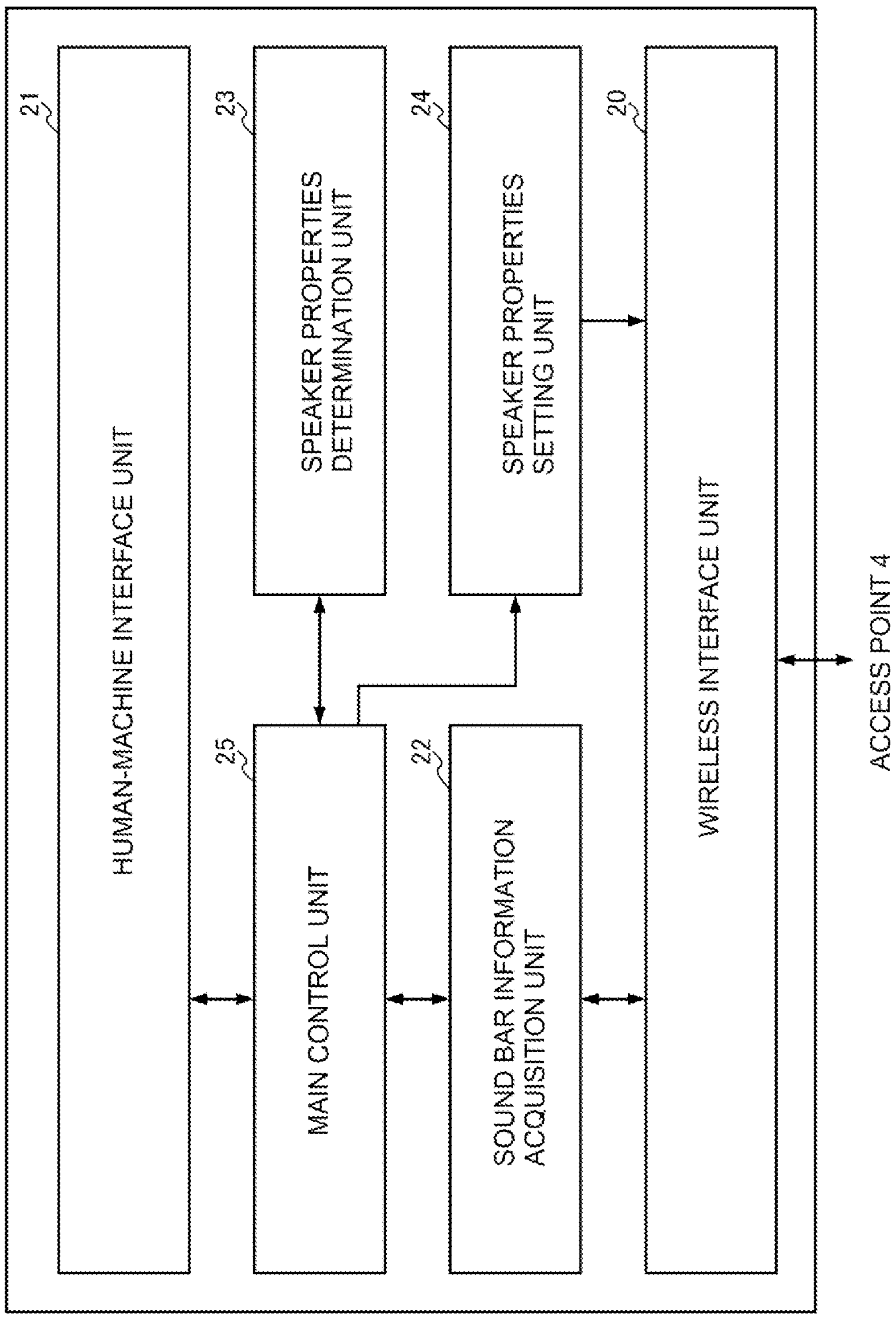
FIG. 2 is a schematic functional configuration diagram of a controller (2).

FIG. 2 is a schematic functional configuration diagram of the controller 2.

As illustrated in the figure, the controller 2 includes a wireless interface unit 20, a human-machine interface unit 21, a sound bar information acquisition unit 22, a speaker properties determination unit 23, a speaker properties setting unit 24, and a main control unit 25.

The wireless interface unit 20 is a communication interface for wirelessly connecting to the access point 4.

The human-machine interface unit 21 is a user interface for displaying information to a user and receiving various operations from the user. The human-machine interface unit 21 is configured from, for example, an input/display device such as a liquid crystal panel having a touch sensor.

The sound bar information acquisition unit 22 acquires, from the sound bar 1 via the wireless interface unit 20, sound bar information including size information on the sound bar 1, channel information on the speakers 10-1 to 10-4 accommodated in the sound bar 1, and screen size information on the television receiver 3 to which the sound bar 1 is connected.

The speaker properties determination unit 23 determines the output volume and the output timing of each of the center channel speaker 10-1, the left channel speaker 10-2, and the right channel speaker 10-3 of the sound bar 1 in accordance with the installation position of the sound bar 1 with respect to the television receiver 3.

The speaker properties setting unit 24 transmits setting information including the output volume and the output timing of each of the center channel speaker 10-1, the left channel speaker 10-2, and the right channel speaker 10-3 determined by the speaker properties determination unit 23 to the sound bar 1 via the wireless interface unit 20.

The main control unit 25 controls each of the units 20 to 24 of the controller 2 in an integrated manner.

The functional configuration of the controller 2 illustrated in FIG. 2 is implemented by a wireless terminal, for example, a smartphone or a tablet personal computer (PC) including a central processing unit (CPU), a memory, an auxiliary storage device such as a flash memory, a wireless LAN adapter, and an input/display device such as a liquid crystal panel having a touch sensor, that uses the CPU to load predetermined programs from the auxiliary storage device onto the memory and execute those programs.

Figure 3:
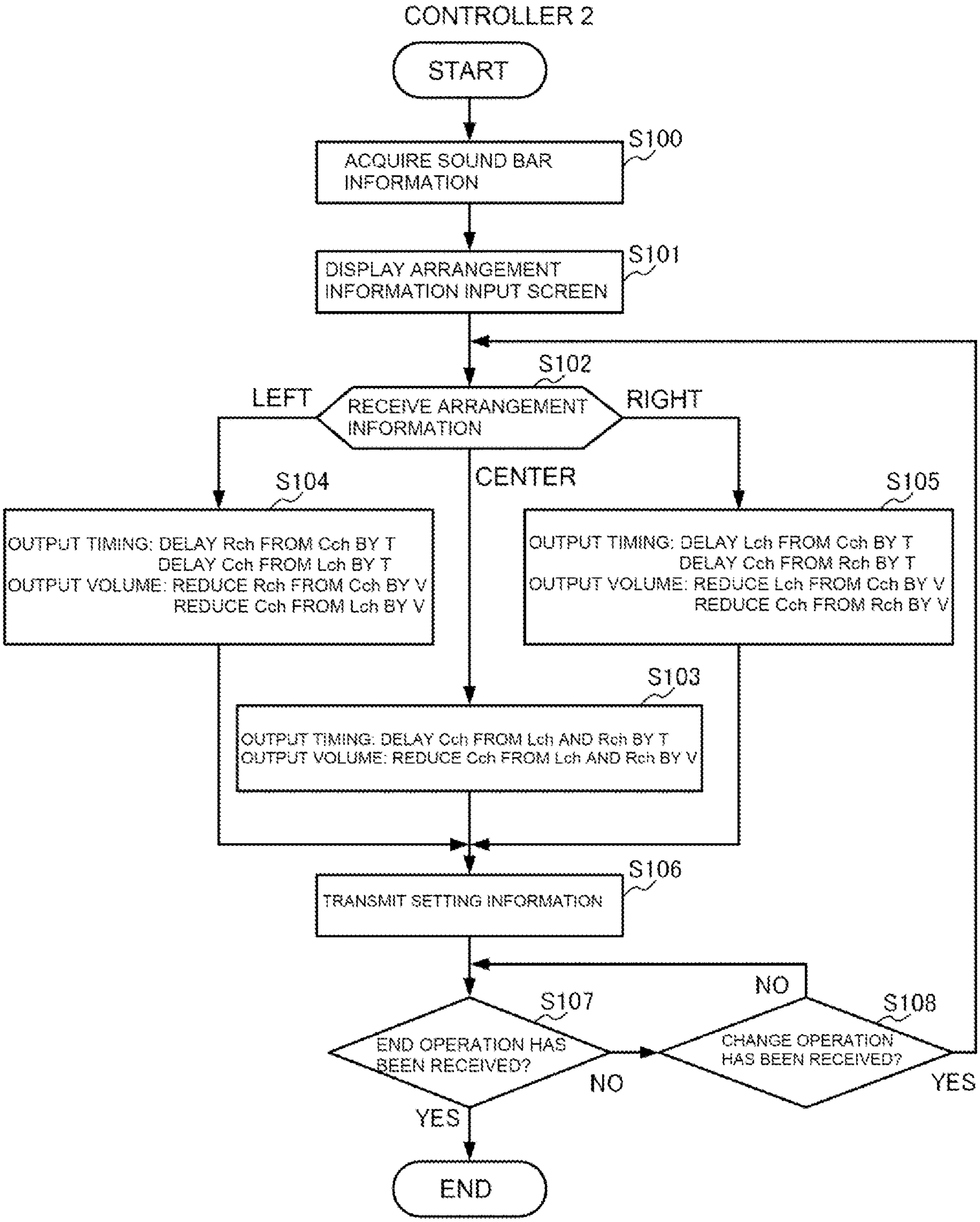
FIG. 3 is a flow chart for illustrating operation of the controller (2).

FIG. 3 is a flow chart for illustrating operation of the controller 2.

This flow is started when the main control unit 25 receives a start operation for setting sound bar properties from the user via the human-machine interface unit 21.

First, the main control unit 25 instructs the sound bar information acquisition unit 22 to acquire the sound bar information. In response to the instruction, the sound bar information acquisition unit 22 accesses the access point 4 via the wireless interface unit 20, and recognizes the sound bar 1 which is wirelessly connected to the access point 4. Then, the sound bar information acquisition unit 22 transmits a sound bar information acquisition request to the sound bar 1, and acquires from the sound bar 1 the sound bar information including the size information on the sound bar 1, the channel information on the speakers 10-1 to 10-4 accommodated in the sound bar 1, and the screen size information on the television receiver 3 to which the sound bar 1 is connected (Step S100).

Next, the main control unit 25 confirms that the sound bar 1 accommodates the center channel speaker 10-1, the left channel speaker 10-2, and the right channel speaker 10-3 based on the sound bar information acquired by the sound bar information acquisition unit 22, and displays on the human-machine interface unit 21 an arrangement information input screen for receiving input of an arrangement position of the sound bar 1 with respect to the television receiver 3 (Step S101). When the sound bar 1 does not accommodate any one of the center channel speaker 10-1, the left channel speaker 10-2, and the right channel speaker 10-3, for example, a predetermined error message is displayed on the human-machine interface unit 21, and the flow is ended.

Figure 4:
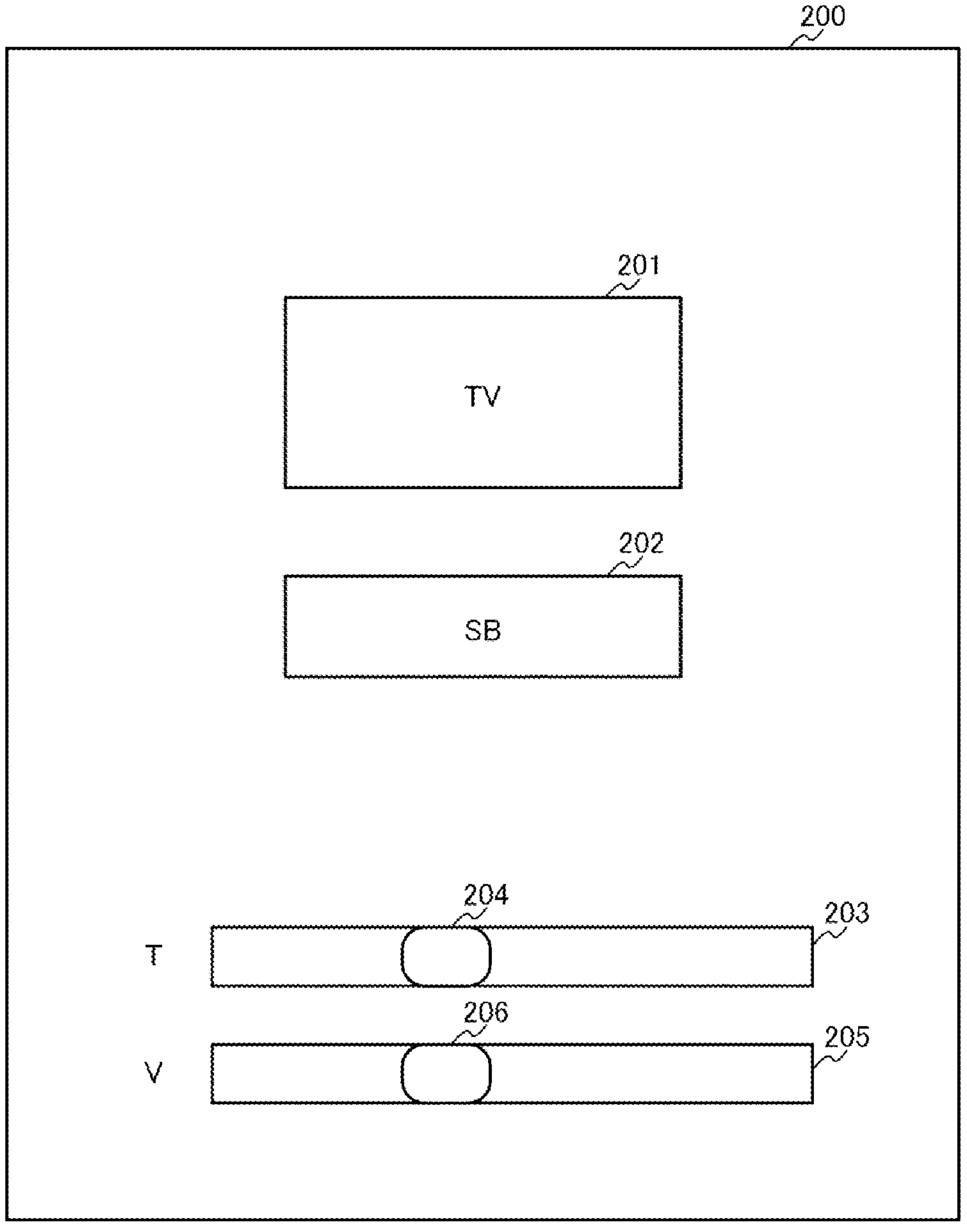
FIG. 4 is a diagram for illustrating an example of an arrangement information input screen (200) displayed on a human-machine interface unit (21) of the controller (2).

FIG. 4 is a diagram for illustrating an example of an arrangement information input screen 200 displayed on the human-machine interface unit 21 of the controller 2.

As illustrated in the figure, an icon 201 indicating the television receiver 3 and an icon 202 indicating the sound bar 1 are displayed on the arrangement information input screen 200. The display position of the icon 201 is fixed, and the icon 201 is not movable by the user. However, the display position of the icon 202 is movable, and the user can input the arrangement position of the sound bar 1 with respect to the television receiver 3 via the arrangement information input screen 200 by dragging and moving the icon 202.

The sizes of the icons 201 and 202 are set based on the screen size information on the television receiver 3 and the size information on the sound bar 1 included in the sound bar information acquired by the sound bar information acquisition unit 22 so that the sizes of the icons 201 and 202 have the same ratio as the actual ratio between the sizes of the television receiver 3 and the sound bar 1.

Further, the arrangement information input screen 200 displays a setting bar 203 for setting a delay time T, which is described later, and a setting bar 205 for setting an attenuation volume V, which is described later. The user can freely set the delay time T by sliding a slider 204 along the setting bar 203. The user can freely set the attenuation volume V by sliding a slider 206 along the setting bar 205.

Next, when the main control unit 25 receives the arrangement position of the sound bar 1 with respect to the television receiver 3 via the arrangement information input screen 200 displayed on the human-machine interface unit 21 (Step S102), the main control unit 25 passes the received arrangement position to the speaker properties determination unit 23 together with the delay time T and the attenuation volume V determined in accordance with the position of the sliders 204 and 206 on the setting bars 203 and 205 at that time.

Figure 5:
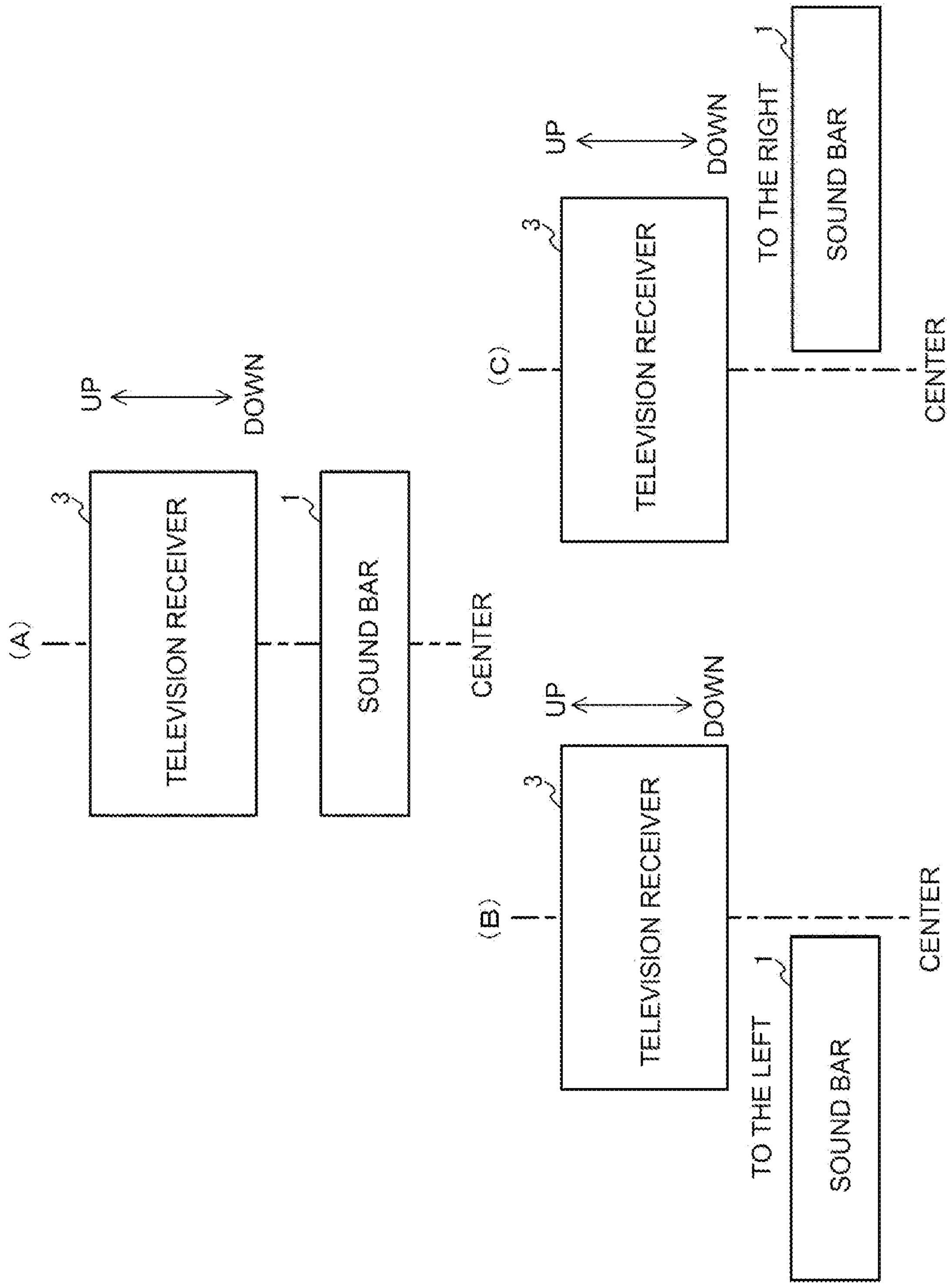
FIG. 5(A), FIG. 5(B), and FIG. 5(C) are diagrams for illustrating an example of an arrangement position of a sound bar (1) with respect to a television receiver (3).

When the arrangement position of the sound bar 1 with respect to the television receiver 3 received from the main control unit 25 is, as illustrated in FIG. 5(A), at the below-and-center position of the television receiver 3 ("center" in Step 102), the speaker properties determination unit 23 determines the output volume and the output timing of the center channel speaker 10-1, the left channel speaker 10-2, and the right channel speaker 10-3 so that the output timing of the center channel speaker 10-1 is delayed from the output timing of the left channel speaker 10-2 and the right channel speaker 10-3 by the delay time T, and the output volume of the center channel speaker 10-1 is reduced from the output volume of the left channel speaker 10-2 and the right channel speaker 10-3 by the attenuation volume V (Step S103).

Further, when the arrangement position of the sound bar 1 with respect to the television receiver 3 received from the main control unit 25 is, as illustrated in FIG. 5(B), to the left of the below-and-center position of the television receiver 3 ("left" in Step 102), the speaker properties determination unit 23 determines the output volume and the output timing of the center channel speaker 10-1, the left channel speaker 10-2, and the right channel speaker 10-3 so that the output timing of the right channel speaker 10-3 is delayed from the output timing of the center channel speaker 10-1 by the delay time T, the output timing of the center channel speaker 10-1 is delayed from the output timing of the left channel speaker 10-2 by the delay time T, the output volume of the right channel speaker 10-3 is reduced from the output volume of the center channel speaker 10-1 by the attenuation volume V, and the output volume of the center channel speaker 10-1 is reduced from the output volume of the left channel speaker 10-2 by the attenuation volume V (Step S104).

Further, when the arrangement position of the sound bar 1 with respect to the television receiver 3 received from the main control unit 25 is, as illustrated in FIG. 5(C), to the right of the below-and-center position of the television receiver 3 ("right" in Step 102), the speaker properties determination unit 23 determines the output volume and the output timing of the center channel speaker 10-1, the left channel speaker 10-2, and the right channel speaker 10-3 so that the output timing of the left channel speaker 10-2 is delayed from the output timing of the center channel speaker 10-1 by the delay time T, the output timing of the center channel speaker 10-1 is delayed from the output timing of the right channel speaker 10-3 by the delay time T, the output volume of the left channel speaker 10-2 is reduced from the output volume of the center channel speaker 10-1 by the attenuation volume V, and the output volume of the center channel speaker 10-1 is reduced from the output volume of the right channel speaker 10-3 by the attenuation volume V (Step S105).

Next, the main control unit 25 notifies the speaker properties setting unit 24 of the output timing and the output volume of the center channel speaker 10-1, the left channel speaker 10-2, and the right channel speaker 10-3 determined by the speaker properties determination unit 23 together with address information on the sound bar 1, which is the acquisition destination of the sound bar information. In response to the notification, the speaker properties setting unit 24 transmits, via the wireless interface unit 20, setting information including the output timing and the output volume of the center channel speaker 10-1, the left channel speaker 10-2, and the right channel speaker 10-3 notified from the main control unit 25 to the sound bar 1 identified by the address information notified from the main control unit 25 (Step S106).

Then, when the main control unit 25 receives an operation to change the arrangement position of the sound bar 1 with respect to the television receiver 3, the delay time T, or the attenuation volume V from the user via the arrangement information input screen 200 displayed on the human-machine interface unit 21 ("NO" in Step S107 and "YES" in Step S108), the process returns to Step S102. Meanwhile, when an operation to end the sound bar properties setting is received from the user via the human-machine interface unit 21 ("YES" in Step S107), the flow is ended.

Figure 6:
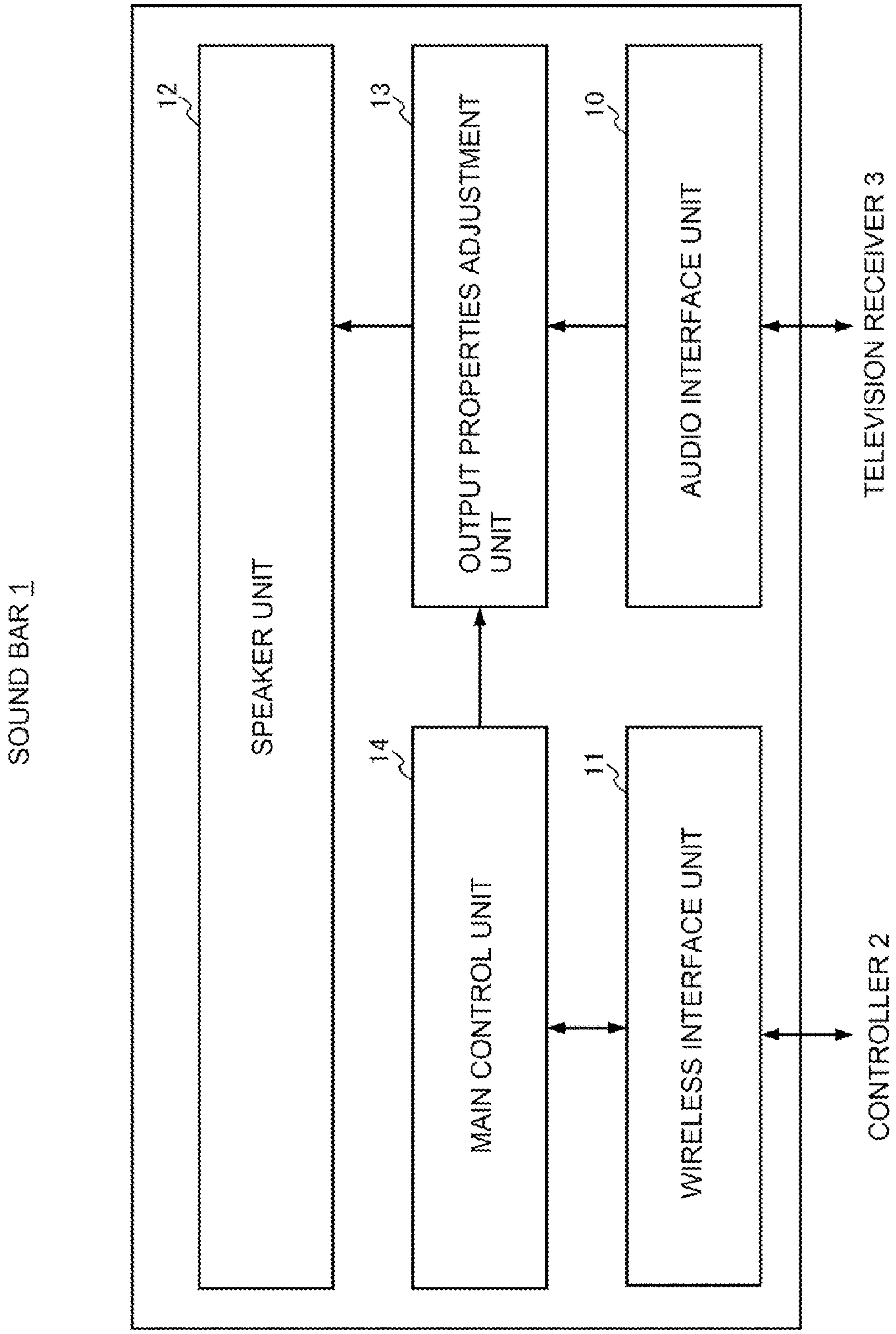
FIG. 6 is a schematic functional configuration diagram of the sound bar (1).

FIG. 6 is a schematic function configuration diagram of the sound bar 1.

As illustrated in the figure, the sound bar 1 includes an audio interface unit 10, a wireless interface unit 11, a speaker unit 12, an output properties adjustment unit 13, and a main control unit 14.

The audio interface unit 10 is an interface for receiving multi-channel audio signals from the television receiver 3, and a communication interface such as HDMI (trademark) or USB is used as the audio interface unit 10.

The wireless interface unit 11 is a communication interface for wirelessly connecting to the access point 4.

The speaker unit 12 includes the center channel speaker 10-1, the left channel speaker 10-2, and the right channel speaker 10-3.

The output properties adjustment unit 13 distributes the multi-channel audio signals received from the television receiver 3 via the audio interface unit 10 to a corresponding one of the channel speakers 10-1 to 10-3 of the speaker unit 12 for each channel. Further, for each audio signal of the center channel, the left channel, and the right channel included in the multi-channel audio signals received from the television receiver 3 via the audio interface unit 10, the output properties adjustment unit 13 adjusts the output timing and the output volume to a corresponding one of the channel speakers 10-1 to 10-3 of the speaker unit 12 in accordance with the setting information notified from the main control unit 14.

The main control unit 14 executes overall control of the units 10 to 13 of the sound bar 1.

The function configuration of the sound bar 1 that is illustrated in FIG. 6 may be implemented in the form of hardware by an integrated logic IC such as an application-specific integrated circuit (ASIC) or a field-programmable gate array (FPGA), or may be implemented in the form of software by a computer such as a digital signal processor (DSP). The function configuration may also be implemented by a CPU by loading a predetermined program out of an auxiliary storage device onto a memory and executing the program on a general-purpose computer such as a PC including the CPU, the memory, the auxiliary storage device, which is a flash memory, a hard disk drive, or the like, a wireless LAN adaptor, and a plurality of speakers.

Figure 7:
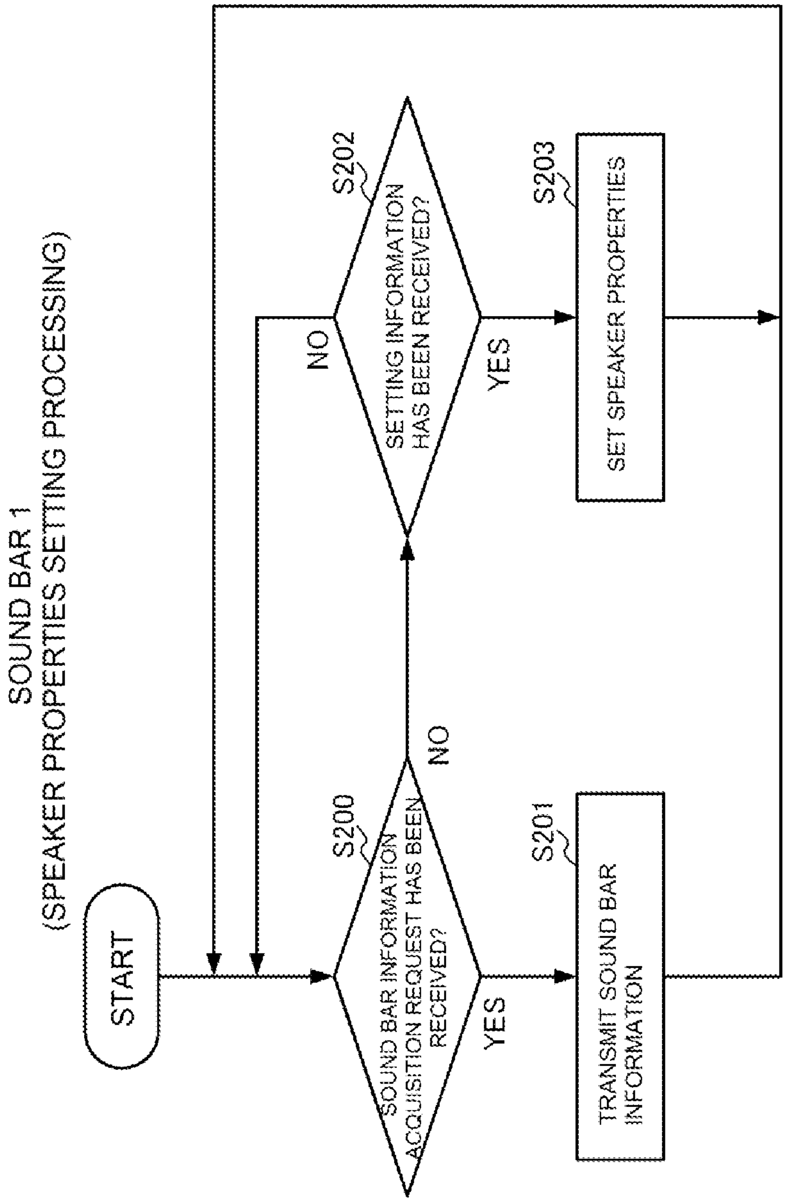
FIG. 7 is a flow chart for illustrating speaker properties setting processing of the sound bar (1).

FIG. 7 is a flow chart for illustrating speaker properties setting processing of the sound bar 1.

When the main control unit 14 receives the sound bar information acquisition request from the controller 2 via the wireless interface unit 11 ("YES" in Step S200), the main control unit 14 generates sound bar information including the size information on the sound bar 1, the channel information on the speakers 10-1 to 10-4 accommodated in the sound bar 1, and the screen size information on the television receiver 3 to which the sound bar 1 is connected, and transmits the generated sound bar information to the controller 2 via the wireless interface unit 11 (Step S201).

Further, when the main control unit 14 receives the setting information from the controller 2 via the wireless interface unit 11 ("YES" in Step S202), the main control unit 14 notifies the output properties adjustment unit 13 of this setting information. In response to the notification, the output properties adjustment unit 13 adjusts, in accordance with the setting information received from the main control unit 14, the output timing and the output volume of a center channel audio signal, a left channel audio signal, and a right channel audio signal to be distributed to the center channel speaker 10-1, the left channel speaker 10-2, and the right channel speaker 10-3 of the speaker unit 12 (Step S203).

As a result, even when the arrangement position of the sound bar 1 deviates from a recommended installation position, the output timing and the output volume of each of the channel speakers 10-1 to 10-3 of the speaker unit 12 are adjusted in accordance with the arrangement position of the sound bar 1 with respect to the television receiver 3 so that the optimum surround sound effect is obtained at the predetermined viewing position.

For example, as illustrated in FIG. 5(A), when the arrangement position of the sound bar 1 with respect to the television receiver 3 is at the below-and-center position of the television receiver 3, the output volume and the output timing of the center channel speaker 10-1, the left channel speaker 10-2, and the right channel speaker 10-3 are adjusted so that the output timing of the center channel speaker 10-1 is delayed from the output timing of the left channel speaker 10-2 and the right channel speaker 10-3 by the delay time T, and the output volume of the center channel speaker 10-1 is reduced from the output volume of the left channel speaker 10-2 and the right channel speaker 10-3 by the attenuation volume V.

Further, as illustrated in FIG. 5(B), when the arrangement position of the sound bar 1 with respect to the television receiver 3 is to the left of the below-and-center position of the television receiver 3, the output volume and the output timing of the center channel speaker 10-1, the left channel speaker 10-2, and the right channel speaker 10-3 are adjusted so that the output timing of the right channel speaker 10-3 is delayed from the output timing of the center channel speaker 10-1 by the delay time T, the output timing of the center channel speaker 10-1 is delayed from the output timing of the left channel speaker 10-2 by the delay time T, the output volume of the right channel speaker 10-3 is reduced from the output volume of the center channel speaker 10-1 by the attenuation volume V, and the output volume of the center channel speaker 10-1 is reduced from the output volume of the left channel speaker 10-2 by the attenuation volume V.

Further, as illustrated in FIG. 5(C), when the arrangement position of the sound bar 1 with respect to the television receiver 3 is to the right of the below-and-center position of the television receiver 3, the output volume and the output timing of the center channel speaker 10-1, the left channel speaker 10-2, and the right channel speaker 10-3 are adjusted so that the output timing of the left channel speaker 10-2 is delayed from the output timing of the center channel speaker 10-1 by the delay time T, the output timing of the center channel speaker 10-1 is delayed from the output timing of the right channel speaker 10-3 by the delay time T, the output volume of the left channel speaker 10-2 is reduced from the output volume of the center channel speaker 10-1 by the attenuation volume V, and the output volume of the center channel speaker 10-1 is reduced from the output volume of the right channel speaker 10-3 by the attenuation volume V.

The first embodiment of the present invention has been described above.

According to this embodiment, the output timing and the output volume of each of the center channel speaker 10-1, the left channel speaker 10-2, and the right channel speaker 10-3 accommodated in the sound bar 1 are adjusted in accordance with the installation position of the sound bar 1 with respect to the television receiver 3. Therefore, even when it is not possible to arrange the sound bar 1 at the below-and-center position of the television receiver 3, surround sound audio which is more appropriate can be achieved at a predetermined viewing position (for example, a position in front of the television receiver 3 by a predetermined distance from the television receiver 3).

Further, in this embodiment, the user can change the delay time T and the attenuation volume V for adjusting the output timing and the output volume of the center channel speaker 10-1, the left channel speaker 10-2, and the right channel speaker 10-3 via the arrangement information input screen 200 displayed on the human-machine interface unit 21 of the controller 2. Therefore, according to this embodiment, the user can determine the delay time T and the attenuation volume V so as to obtain the optimum surround sound audio output while listening to the surround sound audio output from the sound bar 1 (while playing the reproduced sound of the multi-channel audio signals output from the television receiver 3) at the predetermined viewing position, and thus convenience is improved.

In this embodiment, the delay time T and the attenuation volume V for adjusting the output timing and the output volume of the center channel speaker 10-1, the left channel speaker 10-2, and the right channel speaker 10-3 are received directly from the user via the arrangement information input screen 200 displayed on the human-machine interface unit 21 of the controller 2, but the present invention is not limited to this.

For example, a deviation amount in the installation position of the sound bar 1 from the below-and-center position of the television receiver 3 may be received via the arrangement information input screen 200 displayed on the human-machine interface unit 21 of the controller 2. Then, through use of the deviation amount in the installation position of the sound bar 1, the distance between the center channel speaker 10-1 and each of the left channel speaker 10-2 and the right channel speaker 10-3, and the distance from a predetermined listening position to the television receiver 3, the speaker properties determination unit 23 of the controller 2 may calculate the distance from the predetermined listening position to the center channel speaker 10-1, and the distance from the predetermined listening position to each of the left channel speaker 10-2 and the right channel speaker 10-3 and based on the difference between those distances, determine the delay time T and the attenuation volume V.

Further, in this embodiment, a case in which the recommended installation position of the sound bar 1 is at the below-and-center position of the television receiver 3 is described as an example, but the present invention can also be applied to cases in which the recommended installation position of the sound bar 1 is a position other than at the below-and-center position of the television receiver 3 (for example, the above-and-center position of the television receiver 3).

Second Embodiment

Next, a second embodiment of the present invention is described.

Figure 8:
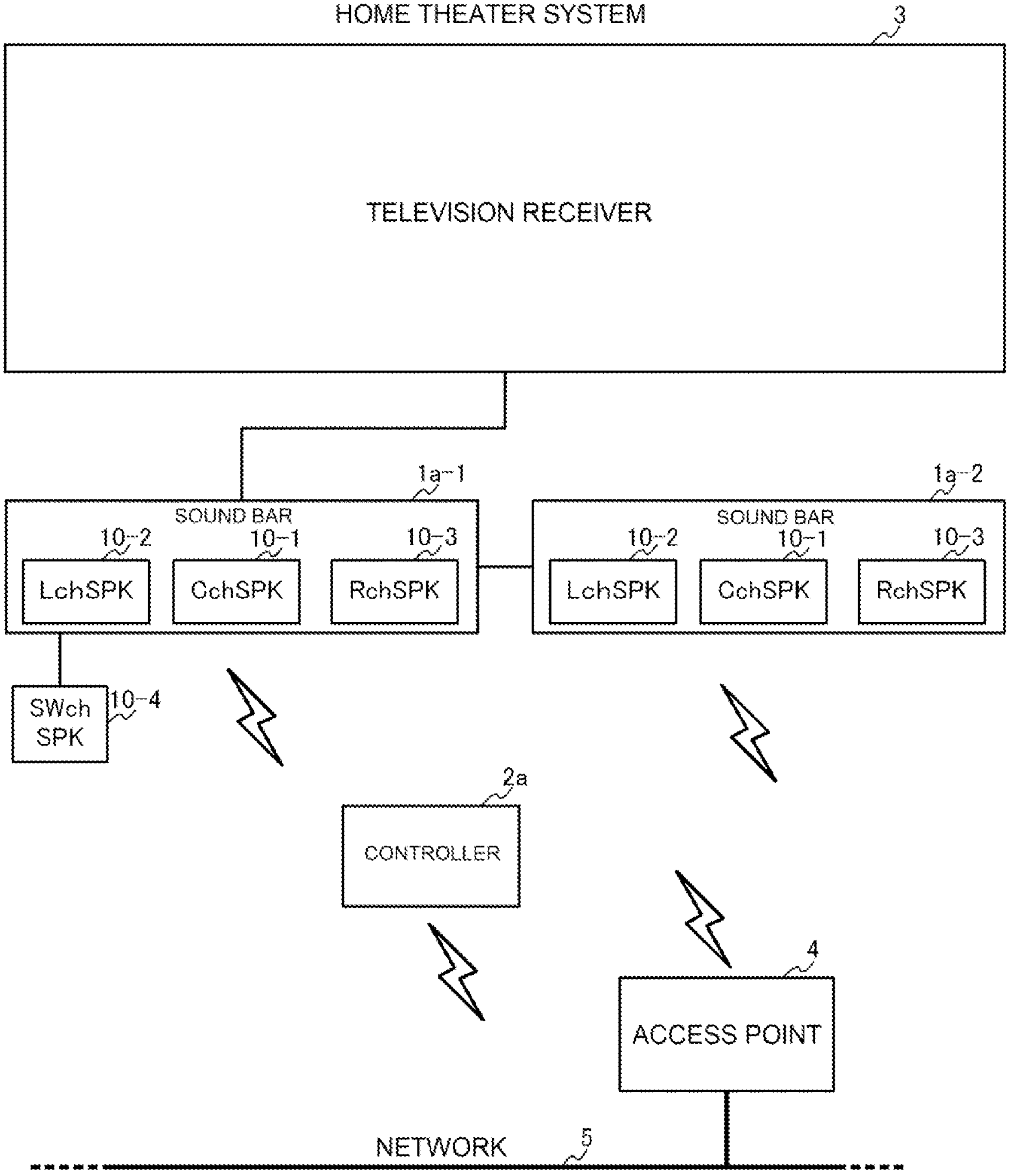
FIG. 8 is a schematic configuration diagram of a home theater system in a second embodiment of the present invention.

FIG. 8 is a schematic configuration diagram of a home theater system in this embodiment.

Here, like reference symbols are given to the same components as those of the home theater system in the first embodiment illustrated in FIG. 1.

As illustrated in the figure, the home theater system in this embodiment includes the television receiver 3, a sound bar 1*a*-1 connected to the television receiver 3 by a communication interface such as HDMI (trademark) or USB, a sound bar 1*a*-2 connected to the sound bar 1*a*-1 by a communication interface such as HDMI (trademark) or USB (the sound bars 1*a*-1 and 1*a*-2 are hereinafter also simply referred to as "sound bars 1*a*"), and a controller 2*a* for setting an assigned channel of the sound bars 1*a*. The sound bars 1*a* and the controller 2*a* are connected to each other via the access point 4 connected to the network 5 such as a WAN or a LAN.

The sound bars 1*a* are so-called two-unit type sound bars, each including the center channel speaker (CchSPK) 10-1, the left channel speaker (LchSPK) 10-2, and the right channel speaker (RchSPK) 10-3, and omitting the subwoofer channel speaker (SWchSPK) 10-4. The subwoofer channel speaker 10-4 is externally connected to the sound bar 1*a*-1. However, the sound bars 1*a* may be so-called one-body type sound bars having the subwoofer channel speaker 10-4 built therein.

The controller 2*a* resets the assigned channels of the channel speaker 10-1, the left channel speaker 10-2, and the right channel speaker 10-3 included in each of the sound bars 1*a*-1 and 1*a*-2 so as to achieve the optimum surround sound audio at a predetermined viewing position (for example, a position in front of the television receiver 3 by a predetermined distance from the television receiver 3).

Figure 9:
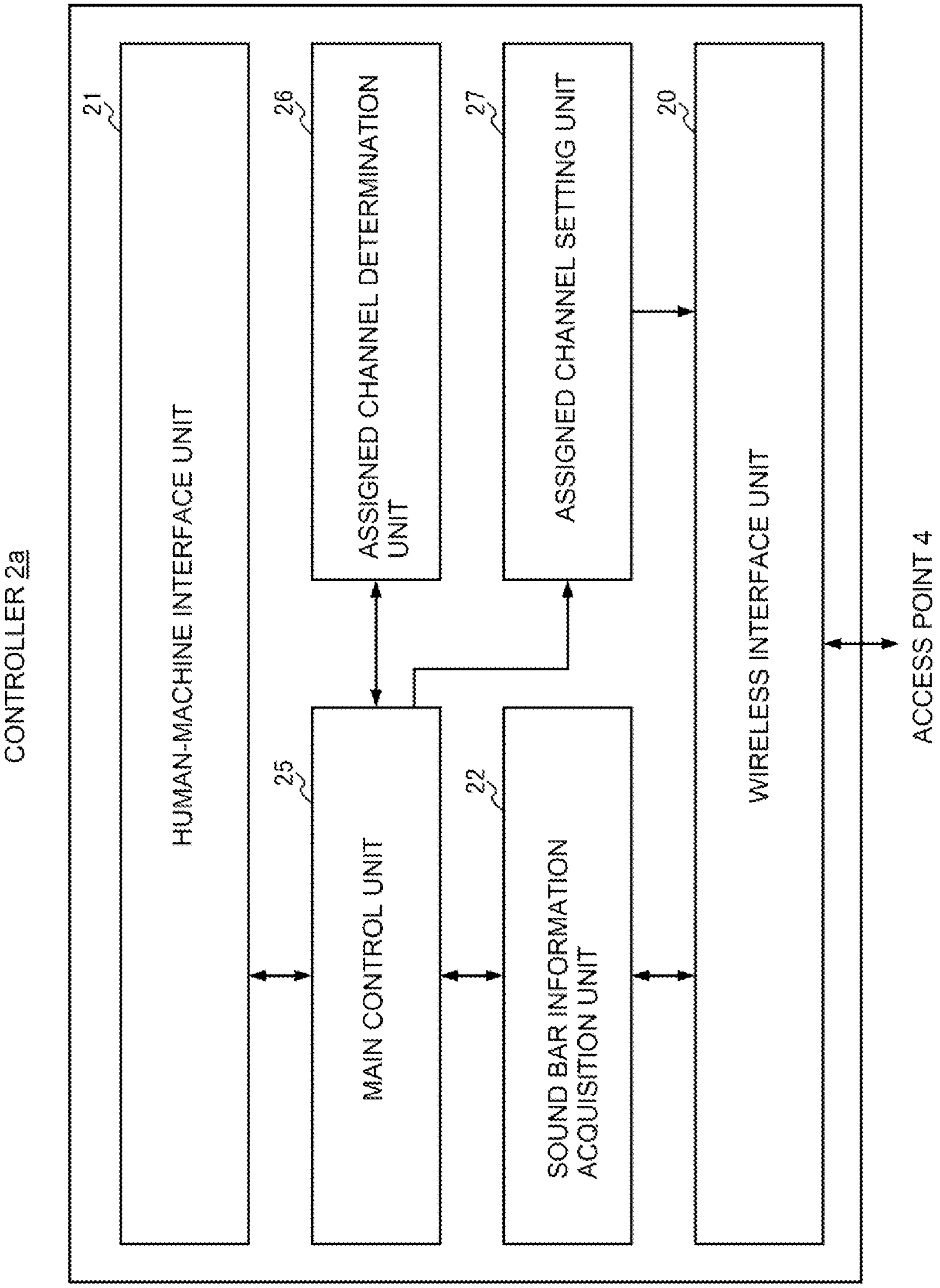
FIG. 9 is a schematic functional configuration diagram of a controller (2*a*).

FIG. 9 is a schematic functional configuration diagram of the controller 2*a*.

Here, like reference symbols are given to components having the same functions as those of the controller 2 according to the first embodiment illustrated in FIG. 2.

As illustrated in the figure, the controller 2*a* includes the wireless interface unit 20, the human-machine interface unit 21, the sound bar information acquisition unit 22, an assigned channel determination unit 26, an assigned channel setting unit 27, and the main control unit 25. The wireless interface unit 20 is a communication interface for wirelessly connecting to the access point 4.

The human-machine interface unit 21 is a user interface for displaying information to a user and receiving various operations from the user. The human-machine interface unit 21 is configured from, for example, an input/display device such as a liquid crystal panel having a touch sensor.

The sound bar information acquisition unit 22 acquires, from one of the sound bars 1*a* via the wireless interface unit 20, sound bar information including size information on the sound bar 1*a*, channel information on the speakers 10-1 to 10-3 accommodated in the sound bar 1*a*, and screen size information on the television receiver 3 in a case in which the connection destination of the sound bar 1*a* is the television receiver 3.

The assigned channel determination unit 26 determines the assigned channel of each of the center channel speaker 10-1, the left channel speaker 10-2, and the right channel speaker 10-3 of each of the sound bars 1*a* in accordance with the installation positions of the plurality of sound bars 1*a* with respect to the television receiver 3.

The assigned channel setting unit 27 transmits, to each sound bar 1*a* via the wireless interface unit 20, setting information including the assigned channel determined for the sound bar 1*a* by the assigned channel determination unit 26 for each of the center channel speaker 10-1, the left channel speaker 10-2, and the right channel speaker 10-3 of the sound bar 1*a*.

The main control unit 25 controls each of the units 20 to 22, 26, and 27 of the controller 2*a* in an integrated manner.

The functional configuration of the controller 2*a* illustrated in FIG. 9 is implemented by, similarly to the case of the controller 2 according to the first embodiment which is illustrated in FIG. 2, a wireless terminal, for example, a smartphone or a tablet PC including a CPU, a memory, an auxiliary storage device such as a flash memory, a wireless LAN adapter, and an input/display device such as a liquid crystal panel having a touch sensor, that uses the CPU to load predetermined programs from the auxiliary storage device onto the memory and execute those programs.

Figure 10:
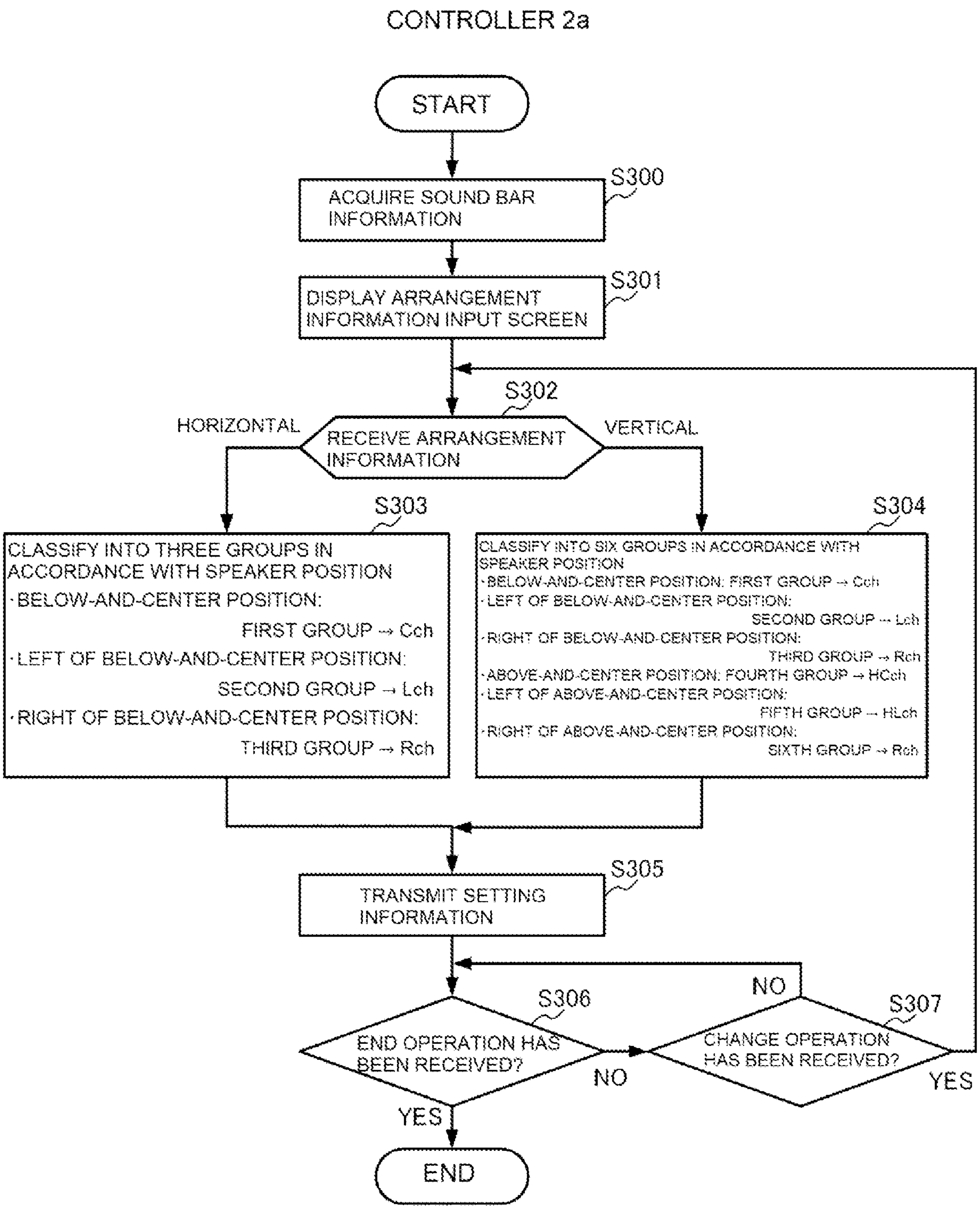
FIG. 10 is a flow chart for illustrating operation of the controller (2*a*).

FIG. 10 is a flow chart for illustrating operation of the controller 2*a*.

This flow is started when the main control unit 25 receives a start operation for setting sound bar assigned channels from the user via the human-machine interface unit 21.

First, the main control unit 25 instructs the sound bar information acquisition unit 22 to acquire the sound bar information. In response to the instruction, the sound bar information acquisition unit 22 accesses the access point 4 via the wireless interface unit 20, and recognizes the plurality of sound bars 1*a* which are wirelessly connected to the access point 4. Then, the sound bar information acquisition unit 22 transmits a sound bar information acquisition request to each sound bar 1*a*, and acquires from each sound bar 1*a* sound bar information including the size information on the sound bar 1*a*, the channel information on the speakers accommodated in the sound bar 1*a*, and the screen size information on the television receiver 3 in the case in which the connection destination of the sound bar 1*a* is the television receiver 3 (Step S300). Here, from the sound bar 1*a*-1, sound bar information including the size information on the sound bar 1*a*-1, the channel information (center channel, left channel, right channel) on the speakers 10-1 to 10-3 accommodated in the sound bar 1*a*-1, and the screen size information on the television receiver 3 is acquired, and from the sound bar 1*a*-2, sound bar information including the size information on the sound bar 1*a*-2 and the channel information (center channel, left channel, right channel) on the speakers 10-1 to 10-3 accommodated in the sound bar 1*a*-2 is acquired.

Next, the main control unit 25 confirms that each of the sound bars 1*a*-1 and 1*a*-2 accommodates the center channel speaker 10-1, the left channel speaker 10-2, and the right channel speaker 10-3 based on the sound bar information on each of the sound bars 1*a*-1 and 1*a*-2 acquired by the sound bar information acquisition unit 22, and displays on the human-machine interface unit 21 an arrangement information input screen for receiving input of an arrangement position of each of the sound bars 1*a*-1 and 1*a*-2 with respect to the television receiver 3 (Step S301).

Figure 11:
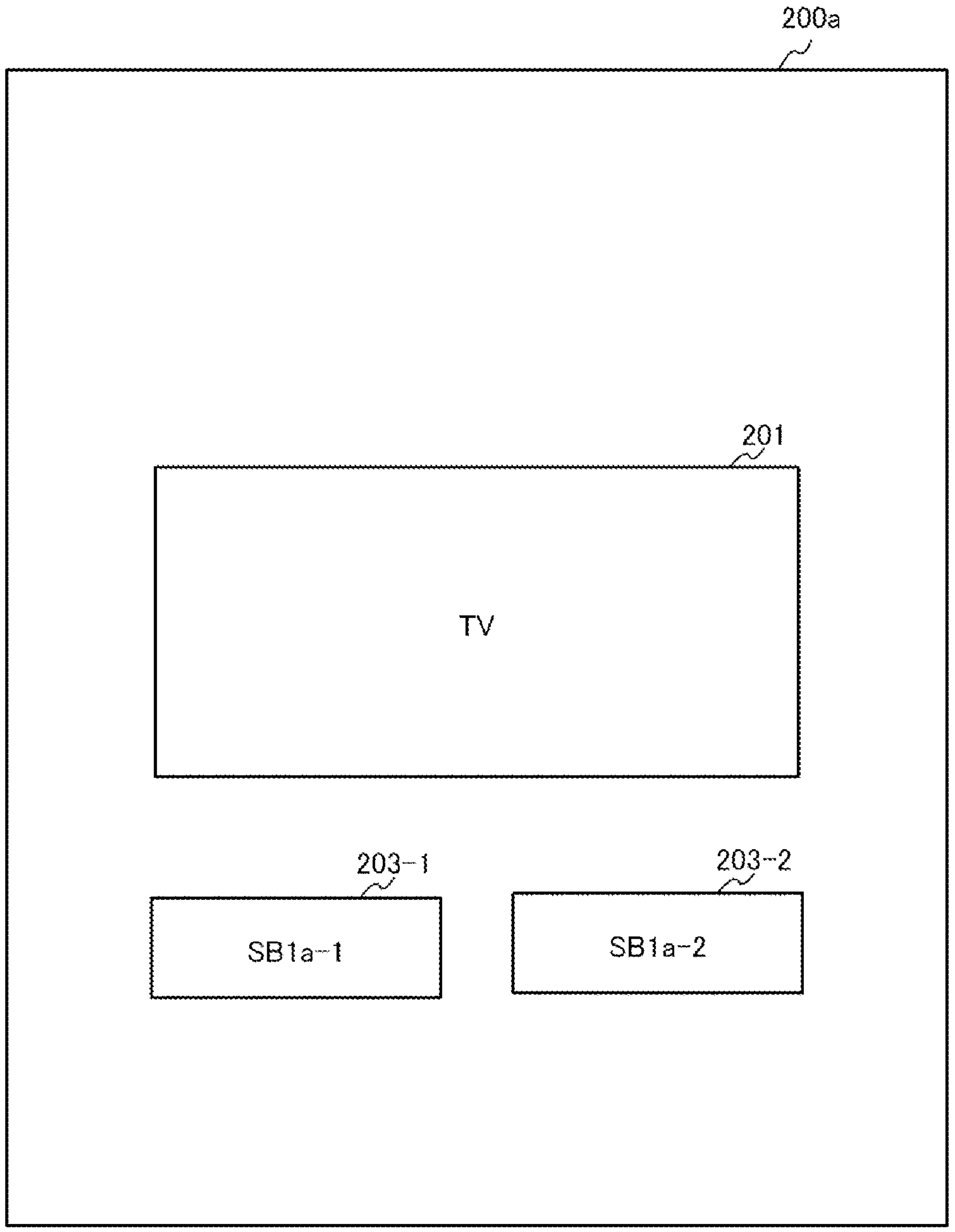
FIG. 11 is a diagram for illustrating an example of an arrangement information input screen (200*a*) displayed on a human-machine interface unit (21) of the controller (2*a*).

FIG. 11 is a diagram for illustrating an example of an arrangement information input screen 200*a* displayed on the human-machine interface unit 21 of the controller 2*a*.

As illustrated in the figure, the icon 201 indicating the television receiver 3, an icon 203-1 indicating the sound bar 1*a*-1, and an icon 203-2 indicating the sound bar 1*a*-2 are displayed on the arrangement information input screen 200*a*. The display position of the icon 201 is fixed, and the icon 201 is not movable by the user. However, the display positions of the icons 203-1 and 203-2 are movable, and the user can input the arrangement positions of the sound bars 1*a*-1 and 1*a*-2 with respect to the television receiver 3 via the arrangement information input screen 200*a* by dragging and moving the icons 203-1 and 203-2.

The sizes of the icons 201, 203-1, and 203-2 are set based on the screen size information on the television receiver 3 and the size information on the sound bar 1*a*-1 included in the sound bar information on the sound bar 1*a*-1 acquired by the sound bar information acquisition unit 22, and the size information on the sound bar 1*a*-2 included in the sound bar information on the sound bar 1*a*-2 acquired by the sound bar information acquisition unit 22, so that the sizes of the icons 201, 203-1, and 203-2 have the same ratio as the actual ratios between the sizes of the television receiver 3 and the sound bars 1*a*-1 and 1*a*-2.

Next, when the main control unit 25 receives the arrangement positions of the sound bars 1*a*-1 and 1*a*-2 with respect to the television receiver 3 via the arrangement information input screen 200*a* displayed on the human-machine interface unit 21 (Step S202), the main control unit 25 passes the received arrangement positions to the assigned channel determination unit 26.

Figure 12:
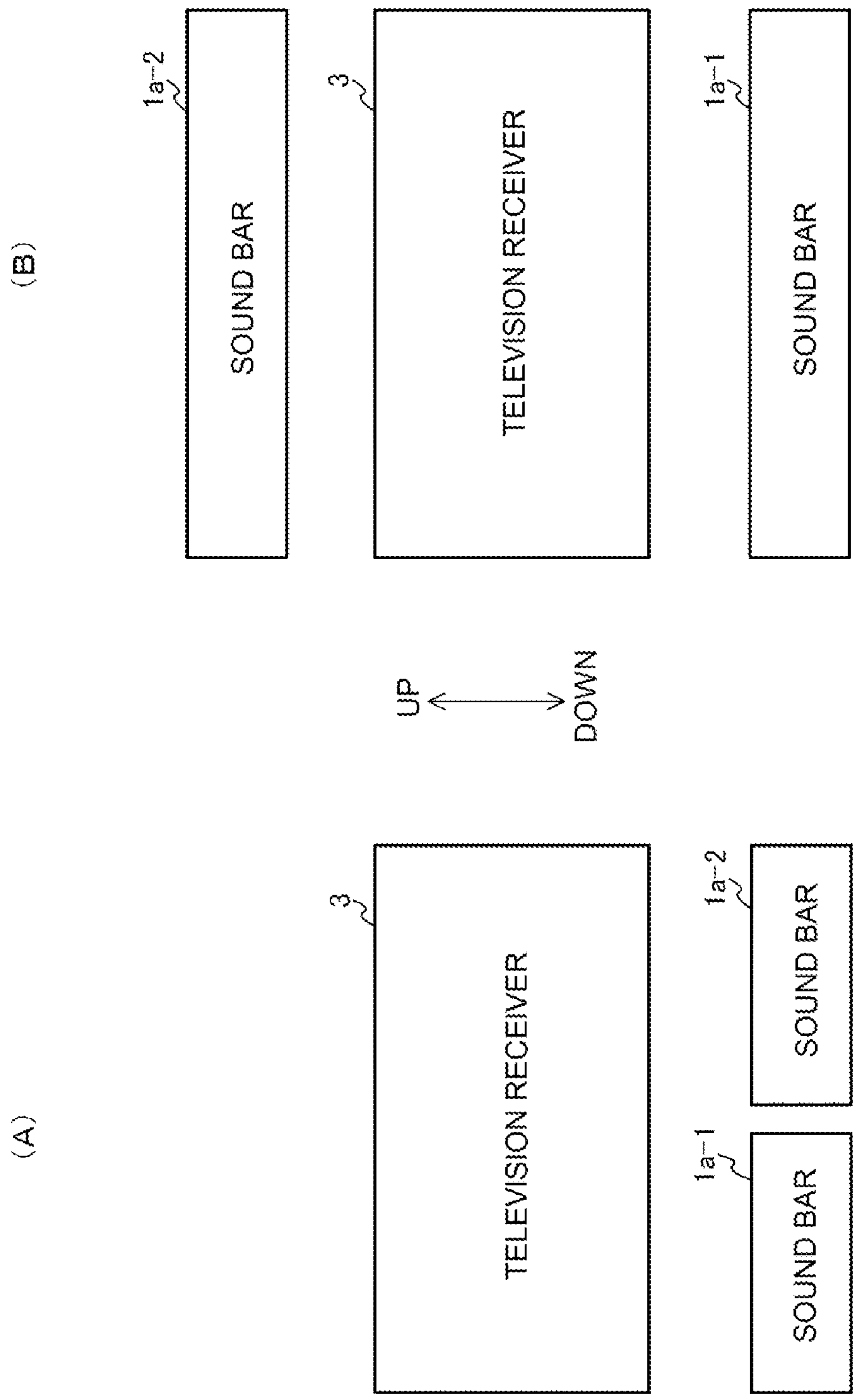
FIG. 12(A) and FIG. 12(B) are diagrams for illustrating an example of an arrangement position of sound bars (1*a*-1) and (1*a*-2) with respect to a television receiver (3).

When the arrangement positions of the sound bars 1*a*-1 and 1*a*-2 with respect to the television receiver 3 received from the main control unit 25 are, as illustrated in FIG. 12(A), aligned below the television receiver 3 in a screen width direction of the television receiver 3 ("horizontal" in Step S302), the assigned channel determination unit 26 classifies the plurality of speakers accommodated in the sound bars 1*a*-1 and 1*a*-2 into the following first to third groups, for example.

- A first group positioned at a below-and-center position of the television receiver 3 (in the example illustrated in FIG. 12(A), the right channel speaker 10-3 of the sound bar 1*a*-1 and the left channel speaker 10-2 of the sound bar 1*a*-2).
- A second group positioned to the left of the below-and-center position of the television receiver 3 (in the example illustrated in FIG. 12(A), the center channel speaker 10-1 and the left channel speaker 10-2 of the sound bar 1*a*-1).
- A third group positioned to the right of the below-and-center position of the television receiver 3 (in the example illustrated in FIG. 12(A), the center channel speaker 10-1 and the right channel speaker 10-3 of the sound bar 1*a*-2).

Then, the assigned channel of the speakers belonging to the first group is determined as the center channel, the assigned channel of the speakers belonging to the second group is determined as the left channel, and the assigned channel of the speakers belonging to the third group is determined as the right channel (Step S303).

Further, when the arrangement positions of the sound bars 1*a*-1 and 1*a*-2 with respect to the television receiver 3 received from the main control unit 25 are, as illustrated in FIG. 12(B), aligned vertically sandwiching the television receiver 3 ("vertical" in Step S302), the assigned channel determination unit 26 classifies the plurality of speakers accommodated in the sound bars 1*a*-1 and 1*a*-2 into the following first to sixth groups, for example.

- A first group positioned at a below-and-center position of the television receiver 3 (in the example illustrated in FIG. 12(B), the center channel speaker 10-1 of the sound bar 1*a*-1).

A second group positioned to the left of the below-and-center position of the television receiver 3 (in the example illustrated in FIG. 12(B), the left channel speaker 10-2 of the sound bar 1*a*-1).

A third group positioned to the right of the below-and-center position of the television receiver 3 (in the example illustrated in FIG. 12(B), the right channel speaker 10-3 of the sound bar 1*a*-1).

A fourth group positioned at an above-and-center position of the television receiver 3 (in the example illustrated in FIG. 12(B), the center channel speaker 10-1 of the sound bar 1*a*-2).

A fifth group positioned to the left of the above-and-center position of the television receiver 3 (in the example illustrated in FIG. 12(B), the right channel speaker 10-2 of the sound bar 1*a*-2).

A sixth group positioned to the right of the above-and-center position of the television receiver 3 (in the example illustrated in FIG. 12(B), the right channel speaker 10-2 of the sound bar 1*a*-2).

Then, the assigned channel of the speakers belonging to the first group is determined as the center channel, the assigned channel of the speakers belonging to the second group is determined as the left channel, the assigned channel of the speakers belonging to the third group is determined as the right channel, the assigned channel of the speakers belonging to the fourth group is determined as a height center channel, the assigned channel of the speakers belonging to the fifth group is determined as a height left channel, and the assigned channel of the speakers belonging to the sixth group is determined as a height right channel (Step S304).

Next, the main control unit 25 notifies the assigned channel setting unit 27 of the assigned channel of each of the center channel speaker 10-1, the left channel speaker 10-2, and the right channel speaker 10-3 determined by the assigned channel determination unit 26 for each sound bar 1*a*, together with the address information on the sound bars 1*a*. The assigned channel setting unit 27 receives the assigned channels and address information, and transmits setting information including the assigned channel of each of the center channel speaker 10-1, the left channel speaker 10-2, and the right channel speaker 10-3 notified by the main control unit 25 for each sound bar 1*a* to the sound bars 1*a* via the wireless interface unit 20 based on the address information on the sound bars 1*a* notified from the main control unit 25 (Step S305).

Then, when the main control unit 25 receives an operation to change the arrangement position of each of the sound bars 1*a*-1 and 1*a*-2 with respect to the television receiver 3 from the user via the arrangement information input screen 200*a* displayed on the human-machine interface unit 21 ("NO" in Step S306 and "YES" in Step S307), the process returns to Step S302. Meanwhile, when an operation to end the sound bar properties setting is received from the user via the human-machine interface unit 21 ("YES" in Step S306), the flow is ended.

Figure 13:
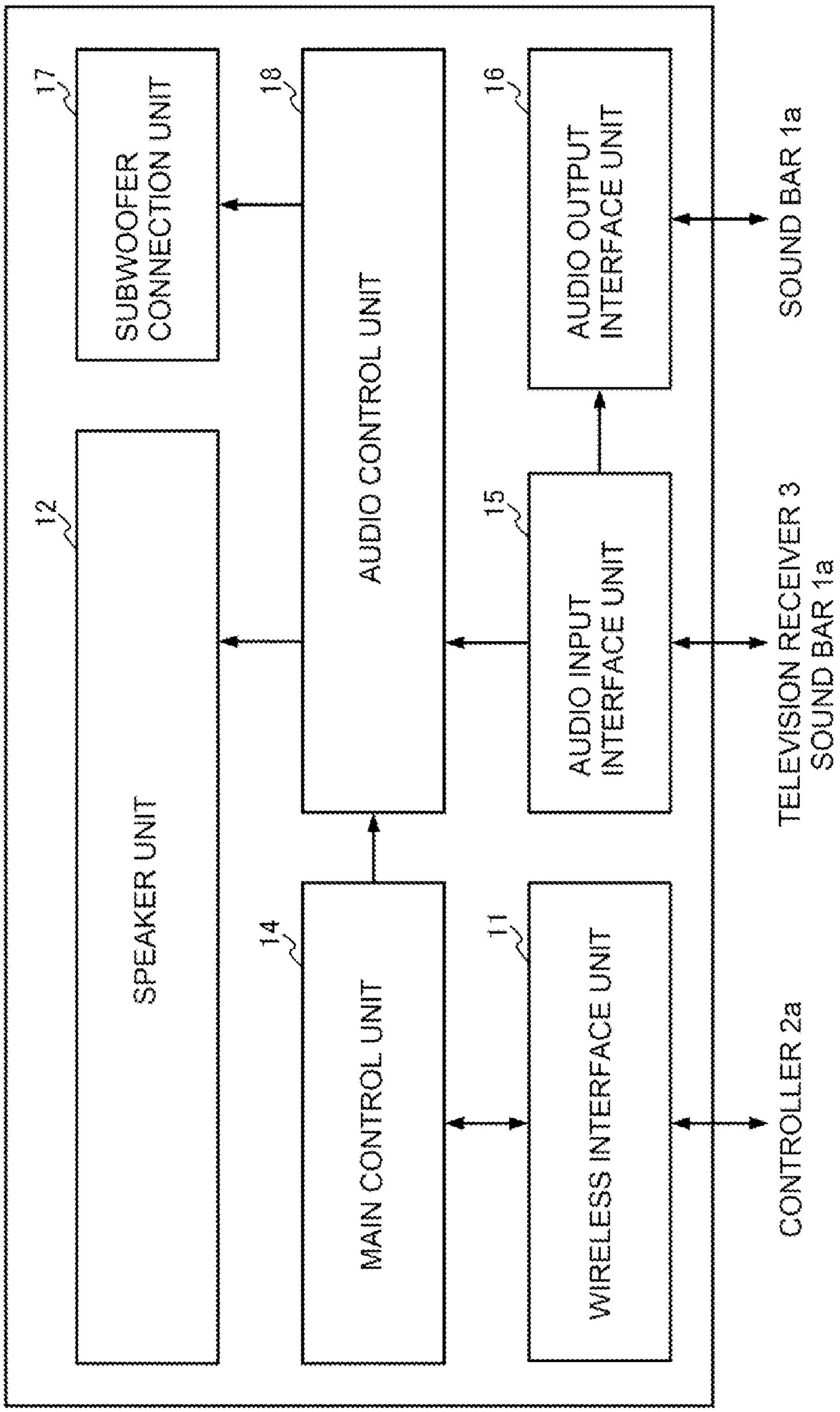
FIG. 13 is a schematic functional configuration diagram of the sound bars (1*a*).

FIG. 13 is a schematic function configuration diagram of each of the sound bars 1*a*.

Here, like reference symbols are given to components having the same functions as those of the sound bar 1 according to the first embodiment illustrated in FIG. 6.

As illustrated in the figure, the sound bars 1*a* each include an audio input interface unit 15, an audio output interface unit 16, the wireless interface unit 11, the speaker unit 12, a subwoofer connection unit 17, an audio control unit 18, and the main control unit 14.

The audio input interface unit 15 is an interface for receiving multi-channel audio signals from the television receiver 3 or another sound bar 1*a*, and a communication interface such as HDMI (trademark) or USB is used as the audio input interface unit 15.

The audio output interface unit 16 is an interface for transmitting multi-channel audio signals to another sound bar 1*a*, and a communication interface such as HDMI (trademark) or USB is used as the audio output interface unit 16.

The wireless interface unit 11 is a communication interface for wirelessly connecting to the access point 4.

The speaker unit 12 includes the center channel speaker 10-1, the left channel speaker 10-2, and the right channel speaker 10-3.

The subwoofer connection unit 17 is an interface for connecting the subwoofer channel speaker 10-4.

The audio control unit 18 resets the assigned channels to the center channel speaker 10-1, the left channel speaker 10-2, and the right channel speaker 10-3 of the speaker unit 12 in accordance with the setting information notified from the main control unit 14. Then, the audio control unit 18 outputs the audio signals of the center channel, the left channel, and the right channel included in the multi-channel audio signals received from the television receiver 3 or another sound bar 1*a* via the audio input interface unit 15 to the respective speaker 10-1 to 10-3 having the corresponding reset assigned channel of the speaker unit 12.

Further, when the subwoofer channel speaker 10-4 is connected to the subwoofer connection unit 17, the audio control unit 18 outputs the subwoofer channel audio signal included in the multi-channel audio signal received from the television receiver 3 or another sound bar 1*a* via the audio input interface unit 15 to the subwoofer connection unit 17.

The main control unit 14 executes overall control of the units 11, 12, and 15 to 18 of the sound bar 1*a*.

As is the case for the function configuration of the sound bar 1 illustrated in FIG. 6, the function configuration of each of the sound bars 1*a* illustrated in FIG. 13 may be implemented in the form of hardware by an integrated logic IC such as an ASIC or an FPGA, or may be implemented in the form of software by a computer such as a DSP. The function configuration of each of the sound bars 1*a* may also be implemented by a CPU by loading a predetermined program out of an auxiliary storage device onto a memory and executing the program on a general-purpose computer such as a PC including the CPU, the memory, the auxiliary storage device, which is a flash memory, a hard disk drive, or the like, a wireless LAN adaptor, and a plurality of speakers.

Figure 14:
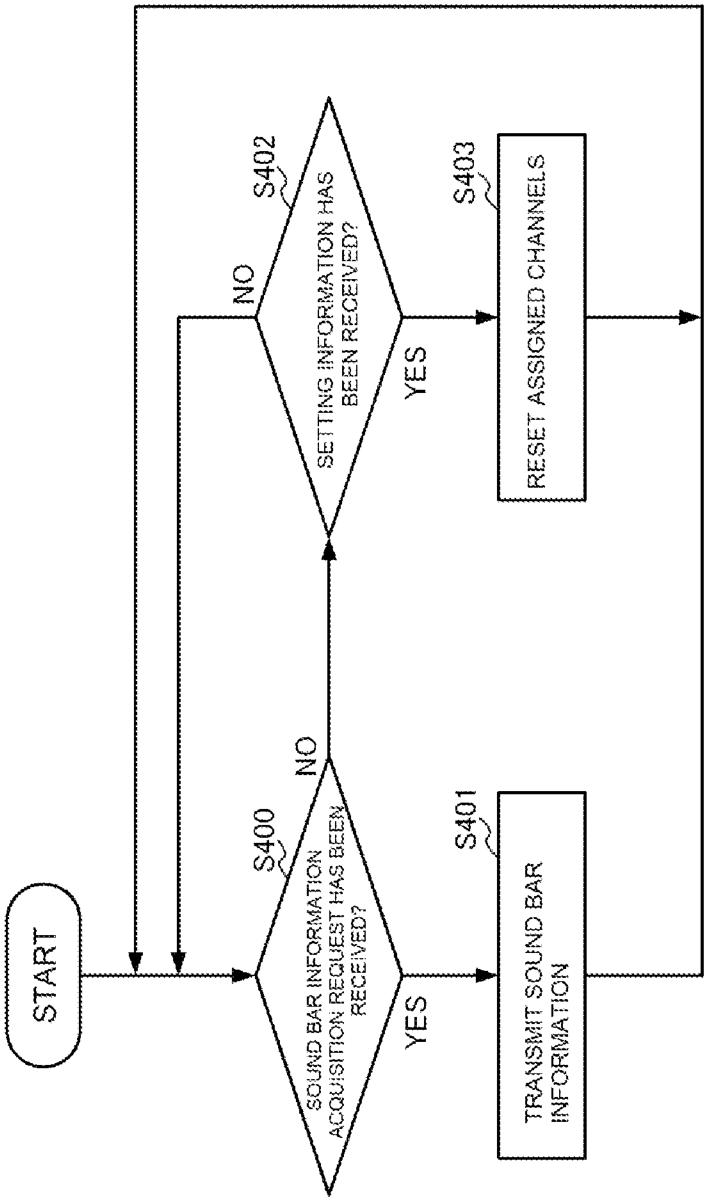
FIG. 14 is a flow chart for illustrating assigned channel resetting processing of the sound bars (1*a*).

FIG. 14 is a flow chart for illustrating assigned channel resetting processing of the sound bar 1*a*.

When the main control unit 14 receives the sound bar information acquisition request from the controller 2*a* via the wireless interface unit 11 ("YES" in Step S400), the main control unit 14 generates sound bar information including the size information on the sound bar 1*a*, the channel information on the speakers 10-1 to 10-3 accommodated in the sound bar 1*a*, and the screen size information on the television receiver 3 in the case in which the television receiver 3 is connected to the sound bar 1*a*, and transmits the generated sound bar information to the controller 2*a* via the wireless interface unit 11 (Step S401).

Further, when the main control unit 14 receives the setting information from the controller 2*a* via the wireless interface unit 11 ("YES" in Step S402), the main control unit 14 notifies the audio control unit 18 of this setting information.

In response to the notification, the audio control unit 18 resets, in accordance with the setting information received from the main control unit 14, the assigned channel assigned to each of the speakers in the setting information for the center channel speaker 10-1, the left channel speaker 10-2, and the right channel speaker 10-3 of the speaker unit 12 (Step S403).

As a result, as illustrated in FIG. 12(A), when the sound bars 1*a*-1 and 1*a*-2 are aligned below the television receiver 3 in the order of the sound bars 1*a*-1 and 1*a*-2 from the left in the screen width direction of the television receiver 3, the center channel is reset as the assigned channel for the right channel speaker 10-3 of the sound bar 1*a*-1 and the left channel speaker 10-2 of the sound bar 1*a*-2, the left channel is reset as the assigned channel for the center channel speaker 10-1 and the left channel speaker 10-2 of the sound bar 1*a*-1, and the right channel is reset as the assigned channel for the center channel speaker 10-1 and the right channel speaker 10-3 of the sound bar 1*a*-2.

Further, as illustrated in FIG. 12(B), when the sound bars 1*a*-1 and 1*a*-2 are aligned vertically sandwiching the television receiver 3 so that the sound bar 1*a*-1 is positioned below the television receiver 3 and the sound bar 1*a*-2 is positioned above the television receiver 3, the center channel is reset as the assigned channel for the center channel speaker 10-1 of the sound bar 1*a*-1, the left channel is reset as the assigned channel for the left channel speaker 10-2 of the sound bar 1*a*-1, the right channel is reset as the assigned channel for the right channel speaker 10-3 of the sound bar 1*a*-1, the height center channel is reset as the assigned channel for the center channel speaker 10-1 of the sound bar 1*a*-2, the height left channel is reset as the assigned channel for the left channel speaker 10-2 of the sound bar 1*a*-2, and the height right channel is reset as the assigned channel for the right channel speaker 10-3 of the sound bar 1*a*-2.

The second embodiment of the present invention has been described above.

According to this embodiment, when a home theater system is built by combining the sound bars 1*a*-1 and 1*a*-2 with the television receiver 3, the assigned channels of the speakers 10-1 to 10-3 accommodated in each of the sound bars 1*a*-1 and 1*a*-2 are reset in accordance with the installation positions of those sound bars 1*a*-1 and 1*a*-2 with respect to the television receiver 3. Thus, for example, even when the user replaces the television receiver 3 with a new television receiver 3 having a larger screen and the width of the sound bar 1*a*-1 that the user currently has is small compared with the width of the new television receiver 3, by adding the sound bar 1*a*-2, the sound bar 1*a*-1 that has been used up to that point is not wasted, and surround sound audio having an expansive sound that matches the screen size of the television receiver 3 can be achieved.

In this embodiment, the controller 2*a* may determine the output timing and the output volume of each speaker so that the output timing of the speakers having the center channel and the height center channel reset as the assigned channel is delayed by the delay time T from the output timing of the speakers having the left channel, the height left channel, the right channel, and the height right channel, respectively, reset as the assigned channel, and the output volume of the speakers having the center channel and the height center channel reset as the assigned channel is reduced by the attenuation volume V from the output volume of the speakers having the left channel, the height left channel, the right channel, and the height right channel, respectively, reset as the assigned channel, and include those pieces of information in the setting information to be transmitted to the sound bars 1*a*-1 and 1*a*-2. Further, the sound bars 1*a*-1 and 1*a*-2 may adjust the output timing and the output volume of the speakers 10-1 to 10-3, in which the center channel, the height center channel, the left channel, the height left channel, the right channel, and the height right channel have each been reset as the assigned channels, in accordance with the setting information received from the controller 2*a*. With this configuration, surround sound audio that is more natural can be achieved at a predetermined viewing position (for example, a position in front of the television receiver 3 by a predetermined distance from the television receiver 3).

In this case, the delay time T and the attenuation volume V for adjusting the output timing and the output volume of the speakers 10-1 to 10-3 in which the center channel, the height center channel, the left channel, the height left channel, the right channel, and the height right channel have each been reset as the assigned channels, may be received from the user via the arrangement information input screen 200*a* displayed on the human-machine interface unit 21 of the controller 2*a*. With this configuration, the user can determine the delay time T and the attenuation volume V so as to obtain the optimum surround sound audio output while listening to the surround sound audio output from the sound bars 1*a*-1 and 1*a*-2 (while playing the reproduced sound of the multi-channel audio signals output from the television receiver 3) at the predetermined viewing position, and thus convenience is improved.

Further, in this embodiment, a case in which surround sound audio is achieved by using two sound bars 1*a*-1 and 1*a*-2 has been described as an example, but the present invention is not limited to this. The present invention is similarly applicable to cases in which surround sound audio is achieved by using three or more sound bars 1*a*.

Further, in this embodiment, as the arrangement examples of the plurality of sound bars 1*a*-1 and 1*a*-2 with respect to the television receiver 3, a case in which the plurality of sound bars 1*a*-1 and 1*a*-2 are arranged below the television receiver 3 and a case in which one of the sound bars 1*a*-1 and 1*a*-2 is arranged below the television receiver 3 and one of the sound bars 1*a*-1 and 1*a*-2 is arranged above the television receiver 3 have been described as examples, but the present invention is also applicable to, for example, a case in which the plurality of sound bars 1*a*-1 and 1*a*-2 are arranged above the television receiver 3 in the screen width direction of the television receiver 3, and a case in which one or more of the sound bars 1*a*-1 and 1*a*-2 are arranged both above and below the television receiver 3.

The present invention is not limited to each of the embodiments described above, and is receptive of various modifications within the scope of the spirit of the present invention.

For example, in each of the embodiments described above, a case in which the home theater system is built by combining the sound bars 1 and 1*a* with the television receiver 3 has been described as an example, but the present invention is not limited to this. The present invention can be widely applied to cases in which a home theater system is built by combining the sound bars 1 and 1*a* with an audio visual (AV) device.

In each of the embodiments described above, communication between the sound bars 1 and 1*a* and the controllers 2 and 2*a* is held via the access point 4. However, the present invention is not limited thereto. Communication between the sound bars 1 and 1*a* and the controllers 2 and 2*a* may be held by short-range wireless communication such as Bluetooth (trademark).

REFERENCE SIGNS LIST

1, 1*a*, 1*a*-1, 1*a*-2: sound bar, 2, 2*a*: controller
3: television receiver, 4: access point, 5: network
10: audio interface unit, 11: wireless interface unit
12: speaker unit, 13: output properties adjustment unit, 14: main control unit
15: audio input interface unit
16: audio output interface unit, 17: subwoofer connection unit
18: audio control unit, 20: wireless interface unit
21: human-machine interface unit, 22: sound bar information acquisition unit
23: speaker properties determination unit, 24: speaker properties setting unit, 25: main control unit
26: assigned channel determination unit, 27: assigned channel setting unit

The invention claimed is:

1. A sound bar system, comprising:

a sound bar configured to accommodate speakers of a plurality of channels including at least a center channel, a left channel, and a right channel in a housing; and a controller configured to set an output volume and an output timing of the speaker of each of the plurality of channels, wherein the controller includes:

a sound bar information acquisition unit for receiving an installation position of the sound bar with respect to a display device forming a home theater system together with the sound bar;

a speaker properties determination unit for determining the output volume and the output timing of the speaker of each of the center channel, the left channel, and the right channel in accordance with the installation position of the sound bar received by the sound bar information acquisition unit; and a speaker properties setting unit for setting the output volume and the output timing of the speaker of each of the center channel, the left channel, and the right channel determined by the speaker properties determination unit in the sound bar, wherein the sound bar includes an output properties adjustment unit for adjusting the output volume and the output timing of the speaker of each of the center channel, the left channel, and the right channel in accordance with a setting by the controller, and wherein the speaker properties determination unit is configured to:

when the installation position of the sound bar received by the sound bar information acquisition unit is to a left of a below-and-center position or an above-and-center position of the display device, delay the output timing of the speaker of the right channel from the output timing of the speaker of the center channel by a delay time T and delay the output timing of the speaker of the center channel from the output timing of the speaker of the left channel by the delay time T, and reduce the output volume of the speaker of the right channel from the output volume of the speaker of the center channel by an attenuation volume V and reduce the output volume of the speaker of the center channel from the output volume of the speaker of the left channel by the attenuation volume V; and when the installation position of the sound bar received by the sound bar information acquisition unit is to a right of the below-and-center position or the above-and-center position of the display device, delay the output timing of the speaker of the left channel from the output timing of the speaker of the center channel by the delay time T and delay the output timing of the speaker of the center channel from the output timing of the speaker of the right channel by the delay time T, and reduce the output volume of the speaker of the left channel from the output volume of the speaker of the center channel by the attenuation volume V and reduce the output volume of the speaker of the center channel from the output volume of the speaker of the right channel by the attenuation volume V.

2. The sound bar system according to claim 1, wherein the speaker properties determination unit is configured to, when the installation position of the sound bar received by the sound bar information acquisition unit is the below-and-center position or the above-and-center position of the display device, delay the output timing of the speaker of the center channel from the output timing of the speaker of each of the left channel and the right channel by the delay time T, and reduce the output volume of the speaker of the center channel from the output volume of the speaker of each of the left channel and the right channel by the attenuation volume V.

3. The sound bar system according to claim 1, wherein the sound bar information acquisition unit is configured to receive input of the delay time T and the attenuation volume V.

4. The sound bar system according to claim 1, wherein the sound bar information acquisition unit is configured to receive a deviation amount in the installation position of the sound bar from the below-and-center position or the above-and-center position of the display device, and wherein the speaker properties determination unit is configured to calculate the delay time T and the attenuation volume V based on the deviation amount received by the sound bar information acquisition unit.

5. The sound bar system according to claim 1, wherein the sound bar and the controller are connected to an access point, the access point being connected to a network.

6. A controller for setting an output volume and an output timing of a speaker of each of a center channel, a left channel, and a right channel accommodated in a sound bar, the controller comprising:

a sound bar information acquisition unit for receiving an installation position of the sound bar with respect to a display device forming a home theater system together with the sound bar;

speaker properties determination unit for determining the output volume and the output timing of the speaker of each of the center channel, the left channel, and the right channel in accordance with the installation position of the sound bar received by the sound bar information acquisition unit; and speaker properties setting unit for setting the output volume and the output timing of the speaker of each of the center channel, the left channel, and the right channel determined by the speaker properties determination means in the sound bar, wherein the speaker properties determination unit is configured to:

when the installation position of the sound bar received by the sound bar information acquisition unit is to a left of a below-and-center position or an above-and-center position of the display device, delay the output timing of the speaker of the right channel from the output timing of the speaker of the center channel by a delay time T and delay the output timing of the speaker of the center channel from the output timing of the speaker of the left channel by the delay time T, and reduce the output volume of the speaker of the right channel from the output volume of the speaker of the center channel by an attenuation volume V and reduce the output volume of the speaker of the center channel from the output volume of the speaker of the left channel by the attenuation volume V; and when the installation position of the sound bar received by the sound bar information acquisition unit is to a right of the below-and-center position or the above-and-center position of the display device, delay the output timing of the speaker of the left channel from the output timing of the speaker of the center channel by the delay time T and delay the output timing of the speaker of the center channel from the output timing of the speaker of the right channel by the delay time T, and reduce the output volume of the speaker of the left channel from the output volume of the speaker of the center channel by the attenuation volume V and reduce the output volume of the speaker of the center channel from the output volume of the speaker of the right channel by the attenuation volume V.

7. The controller according to claim 6, further comprising a human-machine interface unit, configured to receive commands from a user.

8. The controller of claim 6, further comprising a wireless interface unit, configured to provide the sound bar information acquisition unit with information including size information on the sound bar, channel information on the speakers accommodated in the sound bar, and screen size information on the television receiver to which the sound bar is connected.

9. The controller of claim 6, wherein the controller is configured to be implemented by a smartphone, or a tablet personal computer (PC) including a central processing unit (CPU), a memory, an auxiliary storage device, and an input/display device such as a liquid crystal panel having a touch sensor.

10. A controller for setting an output volume and an output timing of a speaker of each of a center channel, a left channel, and a right channel accommodated in a sound bar, the controller comprising:

a sound bar information acquisition unit for receiving an installation position of the sound bar with respect to a display device forming a home theater system together with the sound bar;

a speaker properties determination unit for determining the output volume and the output timing of the speaker of each of the center channel, the left channel, and the right channel in accordance with the installation position of the sound bar received by the sound bar information acquisition unit; and a speaker properties setting unit for setting the output volume and the output timing of the speaker of each of the center channel, the left channel, and the right channel determined by the speaker properties determination means in the sound bar, the speaker properties determination unit being configured to:

when the installation position of the sound bar received by the sound bar information acquisition unit is to a left of a below-and-center position or an above-and-center position of the display device, delay the output timing of the speaker of the right channel from the output timing of the speaker of the center channel by a delay time T and delay the output timing of the speaker of the center channel from the output timing of the speaker of the left channel by the delay time T, and reduce the output volume of the speaker of the right channel from the output volume of the speaker of the center channel by an attenuation volume V and reduce the output volume of the speaker of the center channel from the output volume of the speaker of the left channel by the attenuation volume V; and when the installation position of the sound bar received by the sound bar information acquisition unit is to a right of the below-and-center position or the above-and-center position of the display device, delay the output timing of the speaker of the left channel from the output timing of the speaker of the center channel by the delay time T and delay the output timing of the speaker of the center channel from the output timing of the speaker of the right channel by the delay time T, and reduce the output volume of the speaker of the left channel from the output volume of the speaker of the center channel by the attenuation volume V and reduce the output volume of the speaker of the center channel from the output volume of the speaker of the right channel by the attenuation volume V; and wherein the controller is a wireless terminal.

11. The controller of claim 10, wherein a program is configured to be implemented in the form of a hardware by an integrated logic, a software by a computer, or a CPU by loading a predetermined program out of an auxiliary storage device onto a memory and executing the program on a general-purpose computer including the CPU.

12. A method of setting a sound bar, for setting, by using a controller, an output volume and an output timing of a speaker of each of a center channel, a left channel, and a right channel accommodated in the sound bar, the method comprising:

receiving, by a controller, from a user, an installation position of a sound bar with respect to a display device forming a home theater system together with the sound bar;

determining, by the controller, when the received installation position of the sound bar is to a left of a below-and-center position or an above-and-center position of the display device, the output volume and the output timing of the speaker of each of the center channel, the left channel, and the right channel by delaying the output timing of the speaker of the right channel from the output timing of the speaker of the center channel by a delay time T and delaying the output timing of the speaker of the center channel from the output timing of the speaker of the left channel by the delay time T, and by reducing the output volume of the speaker of the right channel from the output volume of the speaker of the center channel by an attenuation volume V and reducing the output volume of the speaker of the center channel from the output volume of the speaker of the left channel by the attenuation volume V;

determining, by the controller, when the received installation position of the sound bar is to a right of the below-and-center position or the above-and-center position of the display device, the output volume and the output timing of the speaker of each of the center channel, the left channel, and the right channel by delaying the output timing of the speaker of the left channel from the output timing of the speaker of the center channel by the delay time T and delaying the output timing of the speaker of the center channel from the output timing of the speaker of the right channel by the delay time T, and by reducing the output volume of the speaker of the left channel from the output volume of the speaker of the center channel by the attenuation volume V and reducing the output volume of the speaker of the center channel from the output volume of the speaker of the right channel by the attenuation volume V;

setting, by the controller, the determined output volume and output timing of the speaker of each of the center channel, the left channel, and the right channel in the sound bar; and adjusting, by the sound bar, the output volume and the output timing of the speaker of each of the center channel, the left channel, and the right channel in accordance with the setting of the controller.

13. The method of setting a sound bar of claim 12, further acquiring, by the controller, sound bar information from the sound bar including a size information on the sound bar, a channel information on the speaker of each of the center channel, the left channel, and the right channel, and a screen size information on a display device receiver to which the sound bar is connected.

14. A sound bar, which is configured to accommodate speakers of a plurality of channels including at least a center channel, a left channel, and a right channel in a same housing, the sound bar comprising:

an output properties adjustment unit for adjusting, in accordance with a setting of a controller, an output volume and an output timing of the speakers of each of the center channel, the left channel, and the right channel; and a main control unit, wherein when the main control unit receives a sound bar information acquisition request from the controller via a wireless interface unit, the main control unit generates a sound bar information including a size information on the sound bar, a channel information on the speakers, and a screen size information on a television receiver to which the sound bar is connected, and transmits the generated sound bar information to the controller via the wireless interface unit.

15. The sound bar according to claim 14, wherein the housing further comprises a subwoofer channel speaker, wherein the subwoofer channel speaker is configured to be externally connected to the sound bar, or within the housing.

16. The sound bar according to claim 14, wherein the wireless interface unit is configured to wirelessly connect to the controller via an access point.

17. The sound bar according to claim 16, further comprising a main control unit, configured to receive information from the wireless interface unit and command the output properties adjustment unit to adjust the output volume and the output timing of the speakers.

18. The sound bar according to claim 14, wherein the output properties unit distributes a multi-channel audio signal received from an audio interface unit.

* * * * *